US011875644B2

(12) United States Patent
Guerrero et al.

(10) Patent No.: US 11,875,644 B2
(45) Date of Patent: Jan. 16, 2024

(54) GAMING SYSTEMS AND METHODS USING DYNAMIC MODIFIER REGIONS AND SELECTABLE

(71) Applicant: LNW Gaming, Inc., Las Vegas, NV (US)

(72) Inventors: Christopher Guerrero, Las Vegas, NV (US); George Bouvier, Henderson, NV (US); Richard Milosevich, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 1 day.

(21) Appl. No.: 17/555,994

(22) Filed: Dec. 20, 2021

(65) Prior Publication Data

US 2023/0005340 A1 Jan. 5, 2023

Related U.S. Application Data

(60) Provisional application No. 63/217,831, filed on Jul. 2, 2021.

(51) Int. Cl.
*G07F 17/32* (2006.01)
*G07F 17/34* (2006.01)

(52) U.S. Cl.
CPC ...... *G07F 17/3265* (2013.01); *G07F 17/3213* (2013.01); *G07F 17/3258* (2013.01); *G07F 17/3267* (2013.01); *G07F 17/34* (2013.01)

(58) Field of Classification Search
CPC .. G07F 17/3213; G07F 17/3267; G07F 17/34; G07F 17/323; G07F 17/3258; G07F 17/3244
See application file for complete search history.

(56) References Cited

U.S. PATENT DOCUMENTS

| | | | |
|---|---|---|---|
| 3,733,075 | A | 5/1973 | Hooker et al. |
| 5,342,047 | A | 8/1994 | Heidel et al. |

(Continued)

FOREIGN PATENT DOCUMENTS

| | | | |
|---|---|---|---|
| AU | 2015210489 A1 | 2/2016 | |
| GB | 2097160 B | 5/1984 | |

(Continued)

OTHER PUBLICATIONS

Zodiac Lion Class III Slot Game; IGT; Casino Journal, Mar. 5, 2020.

(Continued)

*Primary Examiner* — Justin L Myhr

(57) ABSTRACT

A gaming machine comprises game-logic circuitry and a display device that presents a plurality of symbol positions. The game-logic circuitry causes the display device to: in response to a trigger event, present a multiplier region including a subset of the symbol positions, present one or more multiplier selectors that are associated with at least one symbol position of the subset and include a respective set of multipliers, present one or more game outcomes by populating the plurality of symbol positions with randomly selected symbols, select a multiplier for each multiplier selector associated with symbol positions being occupied by value-bearing symbols through the game outcomes, and update the award indicia for each of the value-bearing symbols associated with the multiplier selectors to indicate a respective updated award value at least partially as a function of an initial award value of the value-bearing symbol and the corresponding selected multiplier.

21 Claims, 21 Drawing Sheets

(56) References Cited

U.S. PATENT DOCUMENTS 5,356,140 A 10/1994 Dabrowski et al.
5,393,061 A 2/1995 Manship et al.
5,704,835 A 1/1998 Dietz
5,833,537 A 11/1998 Barrie
5,951,397 A 9/1999 Dickinson
6,004,207 A 12/1999 Wilson et al.
6,027,115 A 2/2000 Griswold et al.
6,056,642 A 5/2000 Bennett
6,089,977 A 7/2000 Bennett
6,186,894 B1 * 2/2001 Mayeroff ................ G07F 17/34 463/16
6,224,482 B1 5/2001 Bennett
6,251,013 B1 6/2001 Bennett
6,270,411 B1 8/2001 Gura et al.
6,290,600 B1 9/2001 Glasson
6,471,208 B2 10/2002 Yoseloff et al.
6,517,432 B1 2/2003 Jaffe
6,551,187 B1 4/2003 Jaffe
6,561,900 B1 5/2003 Baerlocher et al.
6,561,904 B2 5/2003 Locke et al.
6,569,013 B1 5/2003 Taylor
6,612,927 B1 9/2003 Slomiany et al.
6,638,164 B2 10/2003 Randall et al.
6,641,477 B1 11/2003 Dietz
6,657,923 B2 12/2003 Laughlin
6,731,313 B1 5/2004 Kaminkow
6,786,818 B1 9/2004 Rothschild et al.
6,837,790 B1 1/2005 Kaminkow
6,910,962 B2 6/2005 Marks et al.
6,926,607 B2 8/2005 Slomiany et al.
6,960,134 B2 11/2005 Hartl et al.
7,018,293 B2 3/2006 Brown et al.
7,029,396 B2 4/2006 Jaffe et al.
7,094,148 B2 8/2006 Baerlocher et al.
7,121,942 B2 10/2006 Baerlocher
7,121,945 B2 10/2006 Suganuma et al.
7,147,559 B2 12/2006 Englman
7,179,169 B2 2/2007 Beaulieu et al.
7,252,591 B2 8/2007 Van Asdale
7,258,611 B2 8/2007 Bigelow, Jr. et al.
7,455,585 B2 11/2008 Englman
7,458,890 B2 12/2008 Loose et al.
7,503,847 B2 3/2009 Baerlocher
7,530,894 B1 5/2009 Marks et al.
7,553,231 B2 6/2009 Rodgers et al.
7,604,538 B2 10/2009 Pacey
7,740,245 B2 6/2010 Tarantino
7,819,740 B2 10/2010 Masci et al.
7,980,936 B2 7/2011 Mead
8,062,124 B2 11/2011 Jaffe
8,083,581 B2 12/2011 Marks et al.
8,105,151 B2 1/2012 Caputo et al.
8,162,741 B2 4/2012 Wadleigh et al.
8,192,275 B2 6/2012 Aoki et al.
8,287,357 B2 10/2012 Evans
8,323,091 B2 12/2012 Frank et al.
8,357,041 B1 1/2013 Saunders
8,360,851 B2 1/2013 Aoki et al.
8,366,538 B1 2/2013 Saunders et al.
8,371,930 B1 2/2013 Saunders et al.
8,414,380 B2 4/2013 Saunders et al.
8,465,358 B2 6/2013 Kemper
8,496,522 B2 7/2013 Caputo et al.
8,512,138 B2 8/2013 Saunders
8,523,659 B2 9/2013 Evans
8,574,059 B2 11/2013 Rodgers et al.
8,608,545 B2 12/2013 Arora et al.
8,662,986 B2 3/2014 Rodgers et al.
8,690,660 B2 4/2014 Saunders et al.
8,696,434 B2 4/2014 Tsukahara
8,790,169 B2 7/2014 Saunders
8,851,974 B2 10/2014 Caputo et al.
8,870,642 B2 10/2014 Leupp et al.
8,882,578 B2 11/2014 Saunders
8,956,214 B2 2/2015 Acres
8,961,291 B2 2/2015 Dias Pires et al.
9,005,022 B2 4/2015 Saunders
9,022,848 B2 5/2015 Tarantino
9,053,611 B2 6/2015 Tarantino
9,111,419 B2 8/2015 Tarantino
9,147,318 B2 9/2015 Tarantino
9,165,433 B2 10/2015 Caputo
9,202,345 B2 12/2015 Zoltewicz et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,619,973 B2 4/2017 Acres
9,633,506 B2 4/2017 Basallo et al.
9,704,331 B2 7/2017 Acres
9,721,423 B2 8/2017 Acres
9,728,043 B2 8/2017 Acres
9,754,455 B2 9/2017 Tarantino
9,865,133 B2 1/2018 Acres
9,928,691 B2 3/2018 Olive
9,997,007 B2 6/2018 Acres
10,013,855 B2 7/2018 Nakamura
10,037,651 B2 7/2018 You et al.
10,043,350 B2 8/2018 Gomez et al.
10,127,772 B2 11/2018 Berman et al.
10,204,473 B2 2/2019 Lenger
10,204,485 B2 2/2019 Korthauer et al.
10,339,761 B2 7/2019 Olive
10,366,575 B2 7/2019 Visser
10,388,112 B2 8/2019 You et al.
10,417,877 B2 9/2019 Gomez et al.
10,475,294 B2 11/2019 Gomez et al.
10,529,189 B2 1/2020 Acres
10,553,072 B2 2/2020 Acres
10,643,431 B2 5/2020 Chesworth et al.
10,672,220 B2 6/2020 Lenger
10,706,664 B2 7/2020 Boese et al.
10,769,888 B2 9/2020 You et al.
10,783,742 B2 9/2020 Acres
10,916,100 B2 2/2021 Acres
10,964,164 B2 3/2021 Acres
10,997,824 B2 5/2021 Berman et al.
11,017,626 B2 5/2021 Acres
2001/0048193 A1 12/2001 Yoseloff et al.
2002/0025848 A1 2/2002 Graham et al.
2002/0119818 A1 8/2002 Savio et al.
2002/0151354 A1 10/2002 Boesen et al.
2003/0035346 A1 2/2003 Laughlin
2003/0130034 A1 7/2003 Suganuma et al.
2003/0157980 A1 8/2003 Loose et al.
2003/0162585 A1 8/2003 Bigelow, Jr. et al.
2003/0216165 A1 11/2003 Singer et al.
2003/0216170 A1 11/2003 Walker et al.
2003/0236115 A1 12/2003 Chamberlain
2004/0023714 A1 2/2004 Asdale
2004/0043815 A1 3/2004 Kaminkow
2004/0053672 A1 3/2004 Baerlocher
2004/0082373 A1 4/2004 Cole et al.
2004/0087359 A1 5/2004 Cuddy et al.
2004/0137982 A1 7/2004 Cuddy et al.
2004/0171417 A1 9/2004 Beaulieu et al.
2004/0242316 A1 12/2004 Oles et al.
2005/0037836 A1 2/2005 Gilmore et al.
2006/0068884 A1 3/2006 Baerlocher et al.
2006/0121978 A1 6/2006 Hornik et al.
2006/0189369 A1 8/2006 Taylor
2006/0199634 A1 9/2006 Anderson et al.
2007/0060248 A1 3/2007 Rodgers et al.
2007/0060275 A1 3/2007 Gilmore et al.

(56) References Cited

U.S. PATENT DOCUMENTS

2007/0129135 A1 6/2007 Marks et al.
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0076513 A1 3/2008 Esses et al.
2008/0108431 A1 5/2008 Cuddy et al.
2009/0108526 A1 4/2009 Moody
2009/0131145 A1* 5/2009 Aoki .................. G07F 17/3244 463/20
2009/0239634 A1 9/2009 Nguyen
2009/0291741 A1 11/2009 Schofield
2010/0075737 A1 3/2010 Bluemel
2010/0167815 A1 7/2010 Gagner et al.
2010/0234092 A1 9/2010 Gomez et al.
2010/0304832 A1 12/2010 Kup-Ferroth
2011/0190044 A1* 8/2011 Berman .............. G07F 17/3265 463/20
2012/0122532 A1 5/2012 Berman et al.
2012/0172108 A1 7/2012 Acres
2012/0178517 A1 7/2012 Montenegro et al.
2014/0014186 A1 1/2014 Bhattacharya et al.
2014/0141860 A1 5/2014 Meyer
2014/0179396 A1 6/2014 Aoki et al.
2014/0274292 A1 9/2014 Suda
2014/0323198 A1 10/2014 Tuck
2015/0031437 A1 1/2015 Gomez et al.
2015/0170462 A1 6/2015 Berman et al.
2015/0269809 A1 9/2015 Smith
2015/0287269 A1 10/2015 Berman
2015/0356833 A1* 12/2015 Aoki ........................ G07F 17/34 463/20
2016/0042597 A1 2/2016 Olive
2016/0049038 A1* 2/2016 Nakamura .......... G07F 17/3267 463/20
2017/0154498 A1 6/2017 Olive
2018/0130303 A1* 5/2018 Lamb .................. G07F 17/3213
2018/0268655 A1 9/2018 Olive
2018/0268659 A1 9/2018 Chesworth et al.
2019/0080561 A1 3/2019 Berman et al.
2019/0236905 A1 8/2019 Washington et al.
2019/0340880 A1 11/2019 You et al.
2020/0279457 A1 9/2020 Chesworth et al.
2020/0312083 A1* 10/2020 Halvorson .......... G07F 17/3213
2020/0364982 A1 11/2020 You et al.
2021/0035403 A1* 2/2021 Reynolds ............ G07F 17/3209
2021/0134120 A1* 5/2021 Sanborn .............. G07F 17/3211

FOREIGN PATENT DOCUMENTS

GB 2144568 B 9/1985
GB 2251112 A 6/1992
WO 2003083795 A1 10/2003

OTHER PUBLICATIONS

Zodiac Lion Slot Machine Snapshots from YouTube Video posted Aug. 15, 2019.

* cited by examiner

GAMING SYSTEMS AND METHODS USING DYNAMIC MODIFIER REGIONS AND SELECTABLE

CROSS-REFERENCE TO RELATED APPLICATIONS

This application claims the benefit of priority to U.S. Provisional Patent Application No. 63/217,831, filed Jul. 2, 2021, the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021, SG Gaming, Inc.

FIELD

The present disclosure relates generally to gaming systems, apparatus, and methods and, more particularly, to game features using multipliers or modifiers that change within the game feature.

BACKGROUND

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY

According to one aspect of the present disclosure, a gaming system comprises a gaming machine comprising a display device configured to present a plurality of symbol positions and game-logic circuitry in communication with the display device. The game-logic circuitry is configured to cause the display device to: (i) in response to detecting a trigger event, present a multiplier region including a subset of the plurality of symbol positions; (ii) present one or more multiplier selectors for the multiplier region, each of the one or more multiplier selectors associated with at least one symbol position of the subset and including a respective set of multipliers; (iii) present one or more game outcomes with the multiplier region active by populating the plurality of symbol positions with randomly selected symbols selected from one or more sets of available symbols including value-bearing symbols, each of the value-bearing symbols having award indicia visibly indicating an award value associated with the value-bearing symbol; (iv) select a multiplier from the respective set of multipliers for each of the one or more multiplier selectors associated with any symbol positions of the subset being occupied by value-bearing symbols through the one or more game outcomes; and (v) update the award indicia for each of the value-bearing symbols associated with the one or more multiplier selectors to indicate a respective updated award value at least partially as a function of an initial award value of the value-bearing symbol and the corresponding selected multiplier. In at least some embodiments, the game-logic circuitry may be at least partially integrated within the gaming machine.

According to another aspect of the disclosure, a method of conducting a game using a gaming system is provided. The gaming system comprises game-logic circuitry and a display device of a gaming machine configured to present a plurality of symbol positions. The method comprises causing, by the game-logic circuitry, the display device to: (i) in response to detecting a trigger event, present a multiplier region including a subset of the plurality of symbol positions; (ii) present one or more multiplier selectors for the multiplier region, each of the one or more multiplier selectors associated with at least one symbol position of the subset and including a respective set of multipliers; (iii) present one or more game outcomes with the multiplier region active by populating the plurality of symbol positions with randomly selected symbols selected from one or more sets of available symbols including value-bearing symbols, each of the value-bearing symbols having award indicia visibly indicating an award value associated with the value-bearing symbol; (iv) select a multiplier from the respective set of multipliers for each of the one or more multiplier selectors associated with any symbol positions of the subset being occupied by value-bearing symbols through the one or more game outcomes; and (v) update the award indicia for each of the value-bearing symbols associated with the one or more multiplier selectors to indicate a respective updated award value at least partially as a function of an initial award value of the value-bearing symbol and the corresponding selected multiplier.

Additional aspects of the invention will be apparent to those of ordinary skill in the art in view of the detailed description of various embodiments, which is made with reference to the drawings, a brief description of which is provided below.

Figure 1:
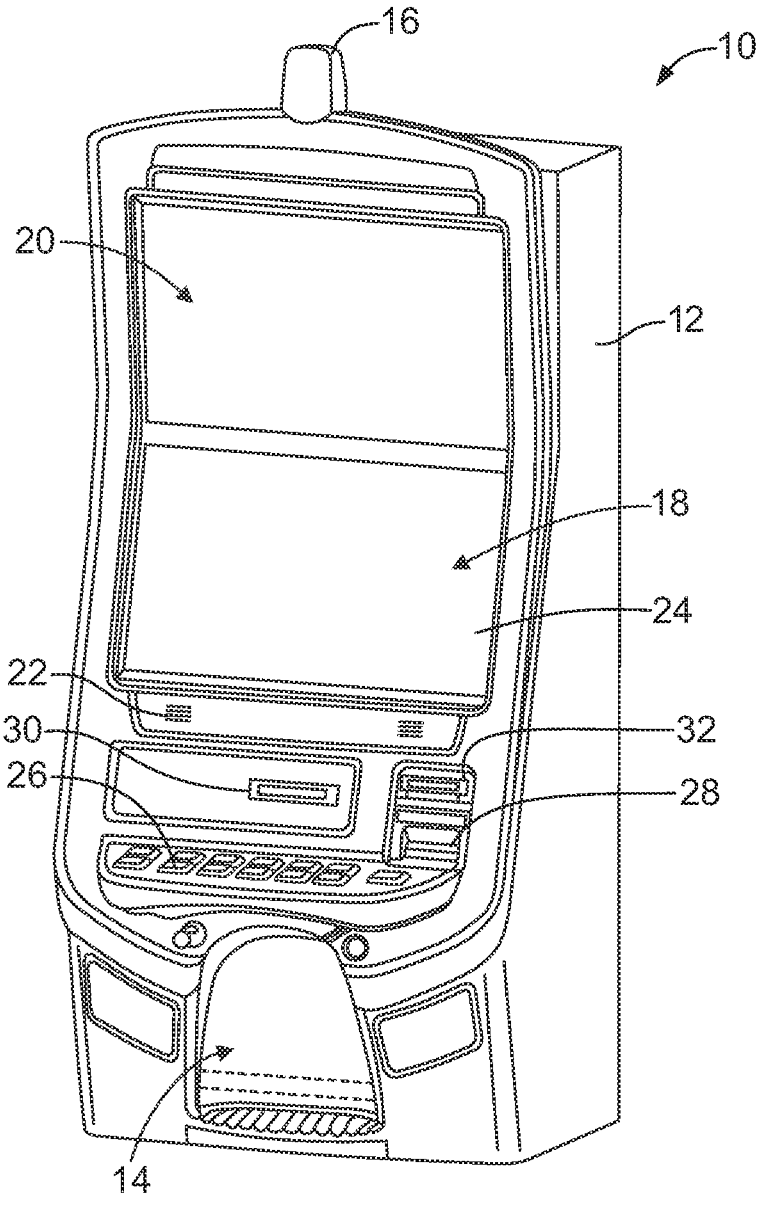
FIG. 1 is a perspective view of a free-standing gaming machine according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all", and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Embodiments of the present invention comprise an innovative application of data processing steps that, when implemented by game-logic circuitry, direct an electronic display device to present a symbol-value aggregation and/or dynamic modifier process that minimizes processing overhead by utilizing numbered indicia to represent credit values instead of complex, fanciful game images. Further, the process aggregates displayed values borne by special symbols (i.e., value-bearing symbols) according to stored, variable criteria. In this way, the value-bearing symbols provide building blocks for innumerable different aggregation sequences simply by manipulating the aggregation criteria associated with the value-bearing symbols, resulting in fewer rules needed for the aggregation process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-aggregation process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
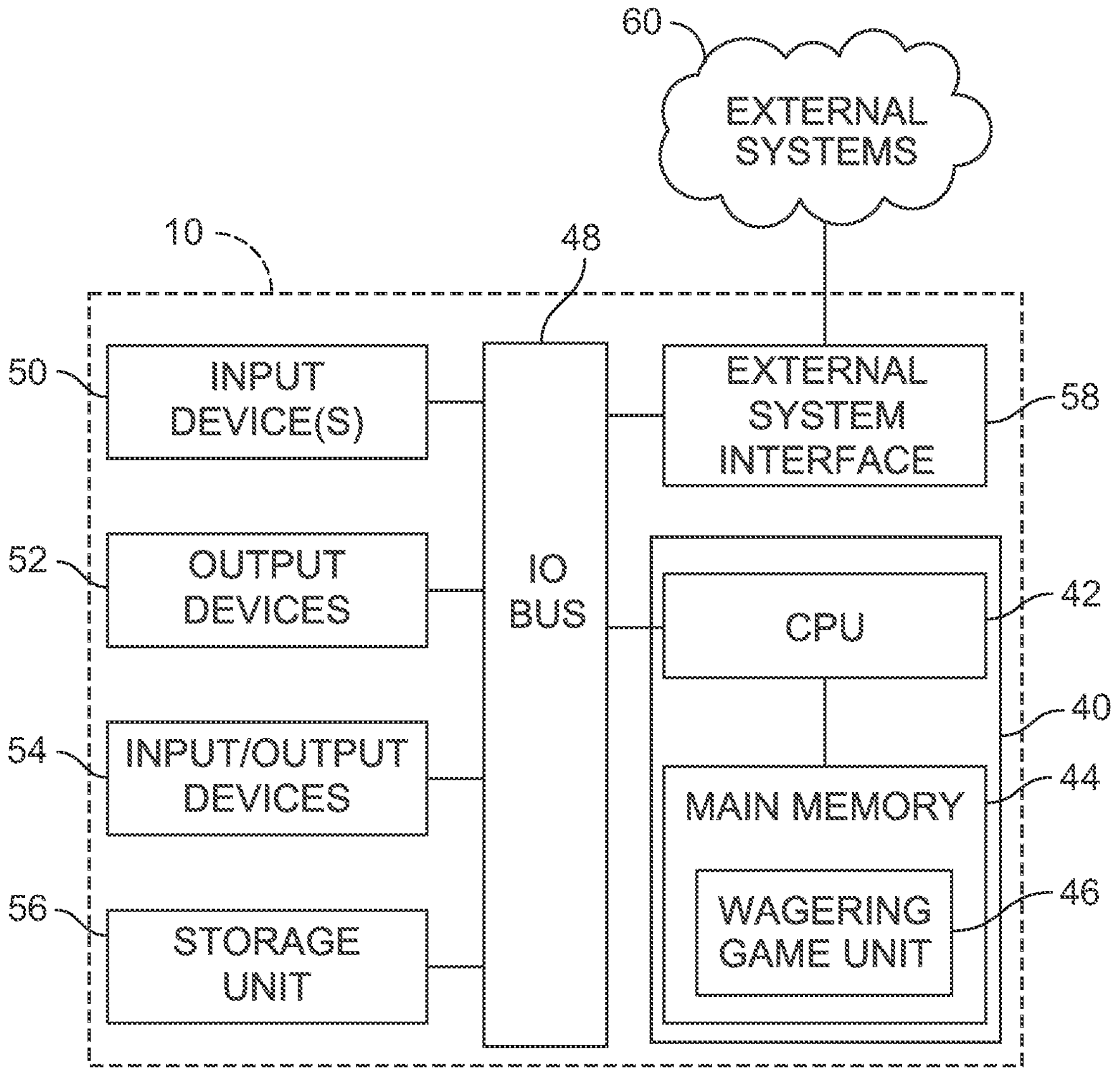
FIG. 2 is a schematic view of a gaming system according to one or more embodiments of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
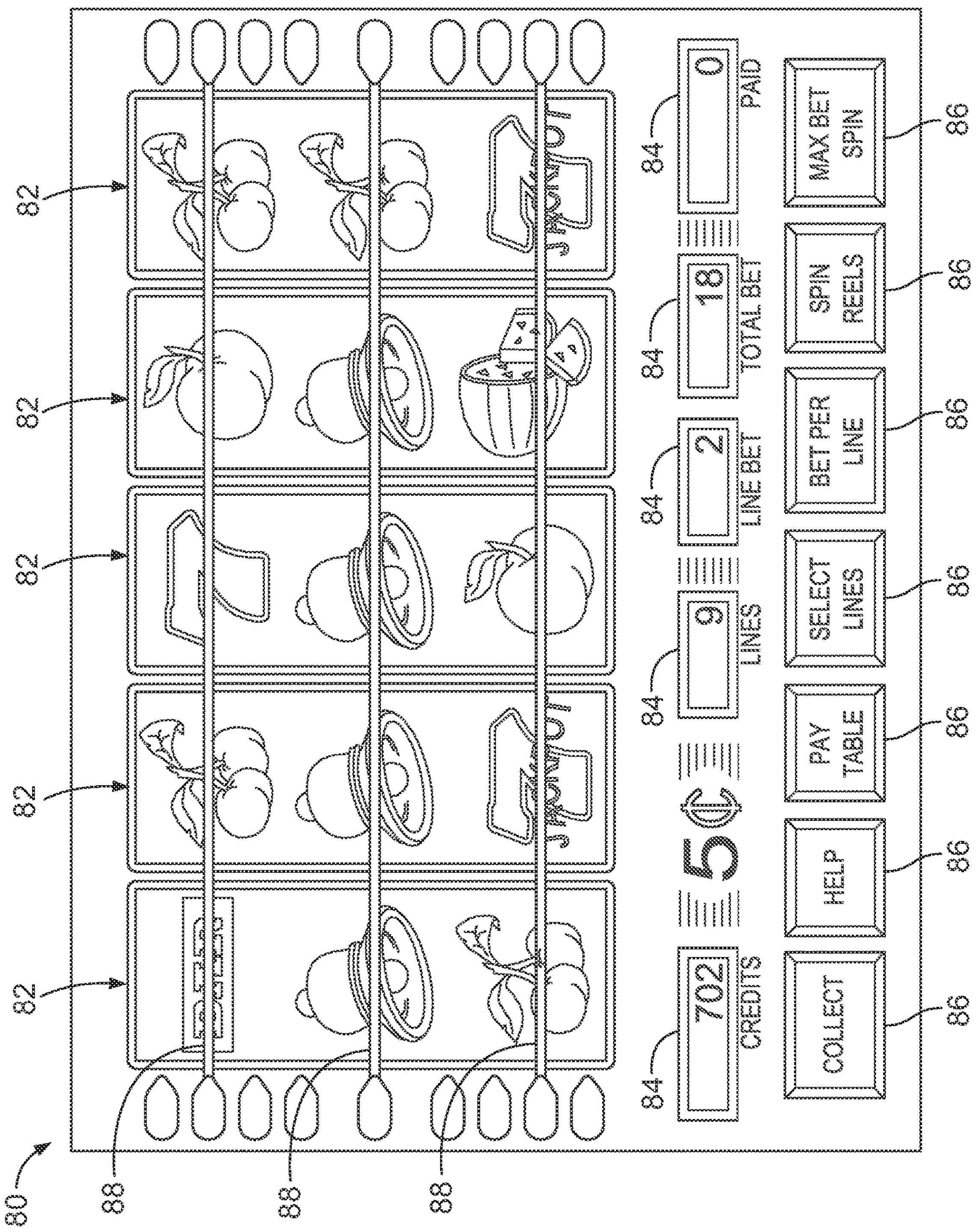
FIG. 3 is an image of an exemplary basic-game screen of a wagering game displayed on a gaming machine, according to one or more embodiments of the present disclosure.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

The gaming systems and methods described herein provide a game feature with dynamic modifiers or multipliers that are applied to value-bearing symbols. The value-bearing symbols include award indicia visually indicating to the player an award value of the value-bearing symbol. It is to be understood that although the term "award value" is used herein, the value may not be limited to a credit amount, but rather may include other forms of value such as jackpots, free spins, and/or other suitable awards. The dynamic modifiers or multipliers are incorporated within a unique presentation sequence for the game feature to invoke player engagement and excitement. In one example, the game feature may have a limited duration, and a set of multipliers may increase as the end of the game feature approaches until a value-bearing symbol is associated with one of the multipliers. In another example, an active modifier region is defined in the play area, and value-bearing symbols within the region after a number of spins or outcomes are modified based on one or more modifiers of the region.

Figure 4:
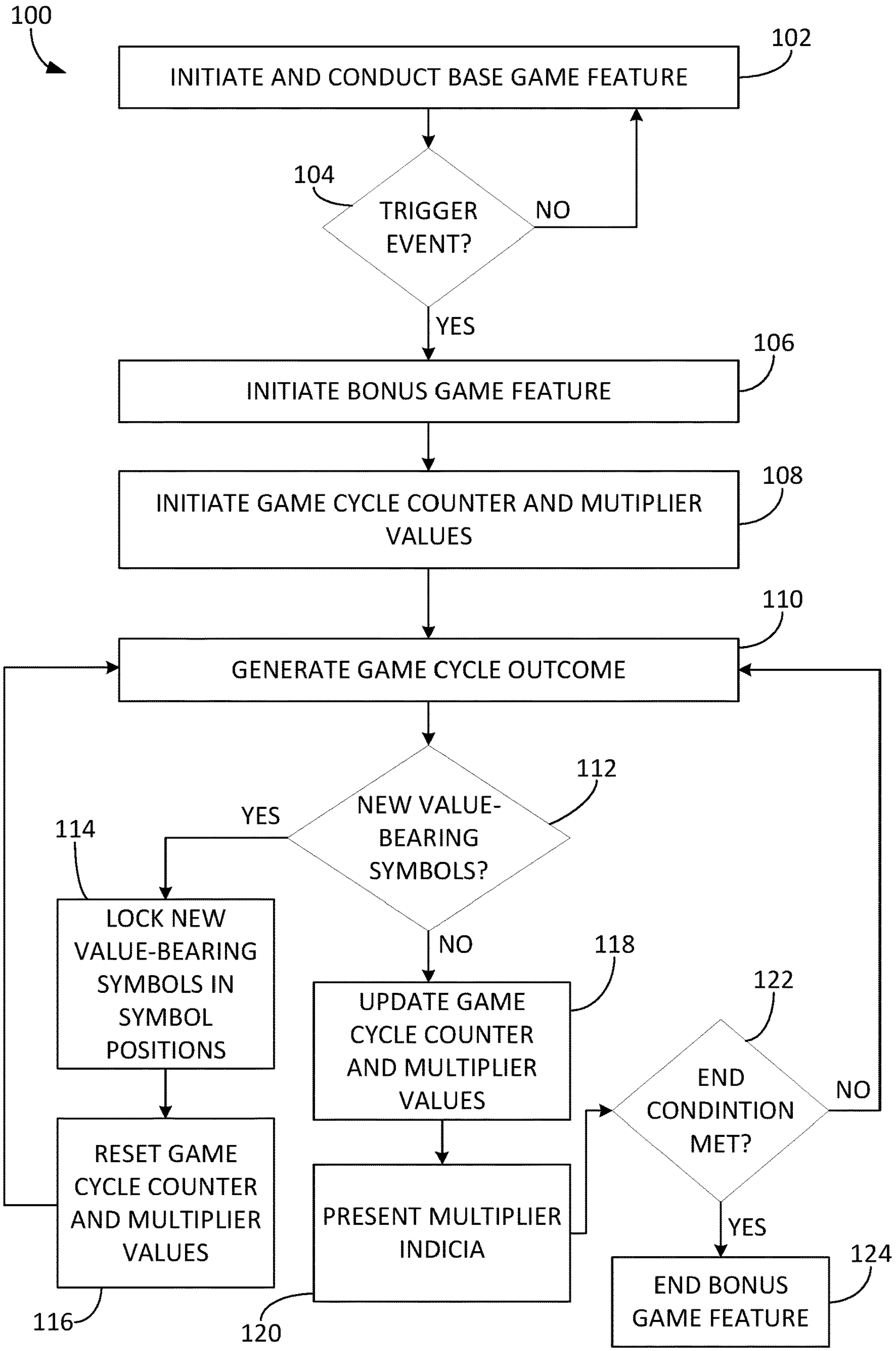
FIG. 4 is a flow diagram of an example method for conducting a game feature including dynamic modifiers or multipliers, according to one or more embodiments of the present disclosure.

Referring now to FIG. 4, a flow diagram of an example method 100 for conducting a game is presented. More specifically, the game associated with the method 100 includes a game feature including value-bearing symbols and dynamic multipliers for the value-bearing symbols. The method 100 may be performed at least partially by game-logic circuitry (e.g., the game-logic circuitry 40, shown in FIG. 2), which may be local and/or remote to a gaming machine used to present the game via one or more display devices. It is to be understood that although a single display device is used herein to describe the presentation of game elements, presenting the game elements over a plurality of display devices is contemplated by the present disclosure as within the scope of a "display device" or "electronic display device" as used herein. In other embodiments, the method 100 may be performed at least partially by another suitable device, and the method 100 may include additional, fewer, or alternative steps, including those described elsewhere herein.

In the example embodiment, at step 102, a base game feature is initiated. Initiation of the base game feature may include a player initiating a gaming session at the gaming machine. For example, for wagering games, the player may present one or more credit inputs to the gaming machine to establish a credit balance for placing wagers and receiving awards. The credit inputs may be physical items (e.g., bills, coins, tickets, cards, etc.) or data communicated to the gaming machine (e.g., funds transferred from a digital wallet of the player). The gaming machine may be configured to receive a plurality of forms of credit input by including a plurality of credit input devices, such as the input devices described in FIG. 1. In another example, the gaming session may be initiated through receiving input other that a credit input, such as receiving indication of a player account associated with the player. The gaming session may be configured to continue until the player manually terminates the session by initiating a cash out sequence, the credit balance is at zero, the gaming machine detects the player has left the gaming machine (e.g., through the absence of player input), and/or other suitable termination conditions are met.

In at least some embodiments, the base game feature may be a reel-based game feature, such as the feature shown in FIG. 3. In other embodiments, other suitable base games may be provided. Play of the base game feature may include generating one or more outcomes and evaluating any winning symbols, sequences, and/or other aspects of the outcomes trigger an award, which may be credited to the player's credit balance. In some embodiments, the base game feature may include value-bearing symbols. The value-bearing symbols may be incorporated within the outcomes of the base game feature (i.e., the award values of the value-bearing symbols can be awarded within the base game feature), or the value-bearing symbols may be limited to triggering a bonus game feature. In other embodiments, the value-bearing symbols are not present in the bonus game feature.

At step 104, the game-logic circuitry detects whether a trigger event has occurred in the base game feature. The trigger event may include one or more conditions of the base game feature that, when present, cause the game-logic circuitry to initiate a bonus game feature. For example, the trigger event may include a number of value-bearing symbols within an outcome of the base game feature meeting or exceeding a threshold number of symbols (e.g., four or six value-bearing symbols). In other embodiments, other suitable trigger events may be used, such as meeting or exceeding a threshold number of a particular non-value-bearing symbol. In the example embodiment, if the trigger event is not detected, play of the base game feature continues. If the trigger event is detected, then the bonus game feature is initiated at step 106.

The bonus game feature is configured to be conducted within a plurality of symbols positions, which may be arranged into a symbol array (e.g., a single grouping of positions arranged in columns and rows) or other suitable groupings. In some embodiments in which the base game feature is conducted using symbol positions, the bonus game feature may use the same symbol positions. In such embodiments, any value-bearing symbols from the trigger event may be retained within the symbol positions for use in the bonus game feature. In other embodiments in which the base game feature does not include value-bearing symbols, initiating the bonus game feature may include populating one or more symbol positions with value-bearing symbols. At the initiation of the bonus game feature, at least one symbol position is unoccupied by a value-bearing symbol.

In the example embodiment, the game-logic circuitry causes any value-bearing symbols within the symbol positions at step 106 to be locked within the symbol positions. That is, for at least one subsequent game cycle or outcome, the locked value-bearing symbols remain in the symbol positions. The game-logic circuitry may cause the display device to visually distinguish locked symbols and symbols positions from unlocked symbol positions. For example, the display device may present a different color, overlay, background, overlay, and/or the like for locked symbol positions. In other embodiments, the presence or absence of the value-bearing symbols may distinguish between locked and unlocked positions.

In the example embodiment, at step 108, the game-logic circuitry initiates a game cycle counter and one or more multiplier values for unlocked symbol positions. The game cycle counter indicates the length of the bonus game feature and may be visually presented to the player. The game cycle counter is initiated at an initial counter value, such as three or zero. The game cycle counter may be configured to increment, decrement, or otherwise change in value in response to events of the bonus game feature as described herein. For example, if the game cycle counter is initiated at three, the game cycle counter may decrement in response to each game cycle outcome and be reset to the initial counter value in response to another event. That is, in at least some embodiments, the game cycle counter is not limited to linear progression and may be reset (to the initial counter value or another suitable value) such that the length of the bonus game feature may be dynamic rather than predetermined.

The multiplier values are generated and assigned to at least a portion of the unlocked symbol positions. In the example embodiment, each unlocked symbol position is assigned a respective multiplier value. In other embodiments, a portion of the unlocked symbol positions may be assigned multiplier values and selecting the portion of unlocked symbol positions may be based at least in part on one or more random determinations, game conditions (e.g., a preexisting value-bearing symbol is adjacent the unlocked symbol position), wager conditions (frequency and/or number of wagers), player conditions, player input, and/or the like. The multiplier values may be independently activated and/or deactivated (which may include removing the multiplier value) as described herein. It is to be understood that the term "deactivated" in the context of multiplier values may include removal of the multiplier value, freezing or locking the multiplier value, and/or otherwise not applying the multiplier value to subsequent game events. The multiplier values may be synchronized such that every active multiplier value has the same value (e.g., 1×, 2×, 4×, 5×, etc.), or the values may be independent from each other. The multiplier values may be initialized at a predetermined value (e.g., 1×) or dynamically determined. The dynamic determination, similar to determining which unlocked symbol positions to assign multiplier values in some embodiments, may be based at least in part on one or more random determinations, game conditions, wager conditions, player conditions, player input, and/or the like.

At step 110, the game-logic circuitry generates a game-cycle outcome. The game-cycle outcome includes selectively populating the unlocked symbol positions with new value-bearing symbols. That is, a game-cycle outcome may include all, none, or a portion of the unlocked symbol positions being populated with value-bearing symbols. The game-cycle outcome may be at least partially generated using one or more random numbers or outcomes. As described in detail herein, generating the game-cycle outcome and presenting the game-cycle outcome may be performed separately or in unison. That is, in one example, the game-logic circuitry may generate all game-cycle outcomes of the bonus game feature prior to and/or during the presentation of the game-cycle outcomes. In another example, the game-logic circuitry may generate and present each game-cycle outcome sequentially. In a further example, the game-logic circuitry may generate one or more random determinations prior to the game-cycle outcomes (e.g., at step 106) that affect the sequential generation and/or presentation of the game-cycle outcomes.

The value-bearing symbols may include a predetermined award value as indicated by the respective award indicia or may include a dynamic award value. The dynamic award value may be selected from a set of available award values or generated as a function of one or more parameters associated with the bonus game feature (e.g., wager frequency, wager amount, game conditions, etc.). In some embodiments, the value-bearing symbols having different award values may be treated as separate symbols in generating the game-cycle outcome, where the game-logic circuitry may randomly select one or none of the available value-bearing symbols for each unlocked symbol position.

Presentation of the game-cycle outcome may include one or more animations to indicate to the player an outcome is occurring. For example, a spinning animation may cycle through available symbols (including no symbol) for each unlocked symbol position before landing on the symbols or lack of symbols within the game-cycle outcome. The presentation of the game-cycle outcome may be automatic or in response to player input, where the player input may be provided to affect the game-cycle outcome or to simply initiate the presentation. It is to be understood that a plurality of suitable animations and presentation elements used to convey the game-cycle outcome are contemplated as within the scope and spirit of the present disclosure.

At step 112, for each game-cycle outcome, the game-logic circuitry determines whether any new value-bearing symbols populated the unlocked symbol positions. In certain embodiments, the determination at step 112 may be focused on specific unlocked symbol positions rather than any unlocked symbol position. If a new value-bearing symbol is detected, the method 100 proceeds to step 114. If no new value-bearing symbol is detected, the method 100 proceeds to step 118.

In the example embodiment, at step 114, the game-logic circuitry causes the display device of the gaming machine to lock the new value-bearing symbols into respective unlocked symbol positions. The respective unlocked symbol positions may be the symbol positions in which the new value-bearing symbols populated in the game-cycle outcome or other suitable unlocked symbol positions. Similar to the locking performed at step 106, the display device may visually distinguish the newly locked symbol positions from the remaining unlocked symbol positions, which may include a transitional animation to reflect the change in state of the locked symbol positions.

In response to a value-bearing symbol being locked into a symbol position having an active multiplier value, the award value of the value-bearing symbol is combined with the active multiplier value to generate an updated award value of the value-bearing symbol. In the example embodiment, the award value is multiplied by the multiplier value, which may result in the same award value (i.e., for multiplier values of 1×) or a different value. The multiplier value may be any suitable value, including zero or fractional values. In other embodiments, the mathematical function to generate the updated award value may not be limited to multiplication between the two values. That is, other suitable mathematical operations may be performed to calculate the updated award value at least from the initial award value and the multiplier value. In certain embodiments, rather than a mathematical function, the award value of a value-bearing symbol is selected from a set of award values, and the multiplier value causes a different award value to be selected from the set of award values.

In the example embodiment, the game-logic circuitry causes the display device to present one or more animations and/or presentation elements to indicate the change in award value to the player. For example, the award indicia of the value-bearing symbol may be animated to indicate the change in award value. In another example, the award indicia may be initially shown with the updated award value, and other animations and/or presentation elements associated with the value-bearing symbol and the occupied symbol position indicate the change to the award value.

In response to a multiplier value being applied to a respective value-bearing symbol, the multiplier value may be deactivated. Deactivating the multiplier value may include visually removing any indication of the multiplier value from the associated symbol position and preventing the multiplier value from changing in response to the game events as described herein. That is, the updated award value of the value-bearing symbol may be locked to a given value because the multiplier value may not change in value or update the award value again. In other embodiments, the multiplier value may be reactivated in response to one or more suitable game events (e.g., the value-bearing symbol occupying the symbol position is shifted to another symbol position, thereby "unlocking" the symbol position and the corresponding multiplier value).

At step 116, the game cycle counter and at least a portion of the active multiplier values may be reset in response to new value-bearing symbols. In the example embodiment, the game cycle counter and the multiplier values are reset to the respective initial values. For example, the game cycle counter may be reset to three, and the multiplier values may be reset to a 1× value. As a result, the game cycle counter is configured to count the number of consecutive game cycle outcomes without new value-bearing symbols, and the multiplier values are configured to change in response to changes to the current count of the game cycle counter as described herein in step 118. In other embodiments, the game cycle counter and/or the multiplier values may be reset to another value instead of the initial respective values. In certain embodiments, the game cycle counter does not reset, but rather continues to count each and every generated game cycle outcome such that the length of the bonus game feature is predetermined.

After step 116, the game-logic circuitry is configured to generate a new game cycle outcome at step 110 and cause the display device to present the new game cycle outcome. As mentioned above, the game-logic circuitry may already have the new game cycle outcome generated and proceeds to cause the display device to present the new game cycle outcome in response to step 116. The method 100 then proceeds again to the determination of step 112 to determine if the new game cycle outcome includes any new value-bearing symbols, where any value-bearing symbols from the first game cycle outcome are now considered to be "preexisting value-bearing symbols."

In the example embodiment, if no new value-bearing symbols are detected in the current game cycle outcome, the game logic circuitry updates the game cycle counter and multiplier values at step 118. More specifically, the game cycle counter is updated to increase or decrease towards a termination value, and the multiplier values are updated at least partially as a function of the updated count of the game cycle counter. In other embodiments, the updates to the game cycle counter and/or the multiplier values may be in response to certain unlocked symbol positions not including new value-bearing symbols in the current game cycle outcome rather than requiring the absence of new value-bearing symbols through all of the unlocked symbol positions.

The game cycle counter may be incremented or decremented to update the current count. In one example, the initial counter value is three, and the termination value is zero. In this example, at step 118, the counter value is decremented by one towards the termination value. When the termination value is reached or exceeded, the bonus game feature may be concluded as described herein. It is to be understood that any suitable mathematical and/or logical operation may be used to update the game cycle counter, and any suitable termination value may be used in the embodiments described herein.

The multiplier values are configured to update in response to changes to the game cycle counter. In some embodiments, the multiplier values are configured to update at least partially as a mathematical function of the current count of the game cycle counter. For example, if the game cycle counter increases from one or two, the multipliers may be updated from 1× to 2×. In other embodiments, each multiplier value is selected from a set of available multiplier values, and changing the game cycle counter causes a new multiplier value to be selected from the set of available multiplier values. In the example embodiment, the multiplier value is selected from a set of at least 1×, 2×, and 5× multiplier values, where the closer the game cycle counter approaches the termination value, the higher the multiplier value. From the player's perspective in the example embodiment, advancement of the game cycle counter means one or more game cycle outcomes without new value-bearing symbols (and therefore potentially no increase to the eventual aggregate award). As a result, the increasing multiplier value may enhance the engagement and excitement of the player through creating tension and "near-miss" opportunities.

To aid the player in contextualizing the changes made in step 118, the game-logic circuitry is configured to cause the display device to present animations and/or presentation elements to update the game cycle counter and/or the multiplier values. For example, the game cycle counter may be presented throughout the bonus game feature, and the current count is visually updated at step 118. To indicate the multiplier values, the display device may be configured to present multiplier indicia at step 120. The multiplier indicia, similar to the award indicia of the award values, provides a visual identity to each multiplier value. Unlike the award indicia, which is associated with a respective value-bearing symbol, the multiplier indicia is associated with a given unlocked symbol position. The multiplier indicia may be presented within the symbol position and/or via other suitable means to indicate the relationship between the symbol position and the multiplier value. In one example, the multiplier indicia is a text-based indicator. In another example, the multiplier indicia is a colored background of the symbol position, where the color of the background indicates which multiplier value is associated with the symbol position. In certain embodiments, a single multiplier indicum may be presented for a plurality of symbol positions, such as when a group of adjacent symbol positions have the same multiplier value.

It is to be understood that, although step 120 is illustrated as occurring between steps 118 and 122, the multiplier indicia may be presented at any suitable point of the bonus game feature (e.g., at the initial state of step 106) and may persist through a plurality of steps of the method 100. In some embodiments, the multiplier indicia are not shown for multiplier values of 1×, but rather are shown for 2×, 3×, . . . , N× multiplier values to give the player an expectation of a change in the award value of a value-bearing symbol in response to populating the associated symbol position. Removal of multiplier values from symbol positions may be indicated to the player through the visual removal of and/or visual changes to the multiplier indicia. In certain embodiments, the visual changes to the multiplier indicia may be different depending on the underlying change to the multiplier value (e.g., visual changes for removal of the multiplier value may be different from the visual changes for the multiplier value resetting).

In the example embodiment, at step 122, the game-logic circuitry determines whether or not any termination or end conditions of the bonus game feature have been met. If one or more termination conditions have been met, the bonus game feature may conclude or otherwise progress to a new stage of the bonus game feature at step 124. If no termination conditions have been met, the game-logic circuitry continues to generate a new, subsequent game cycle outcome, thereby repeating steps 110-122. The termination conditions may include the game cycle counter reaching or exceeding a termination counter value. For example, if the initial counter value is three, the game cycle counter may be decremented at step 118 until the current count reaches or exceeds a termination counter value of zero, which causes the bonus game feature to conclude. Other suitable termination conditions may be considered in combination with the current count of the game cycle counter and/or separately from the current count. For example, the player may be given the option to manually initiate a "card-out" or "cashout" sequence to end the bonus game feature. In another example, populating each and every symbol position with a value-bearing symbol may automatically end the bonus game feature. In such an example, the determination at step 122 may also occur with steps 112, 114, and 116 to detect whether every symbol position has been occupied.

In the example embodiment, the display device is configured to present one or more award sequences associated with the bonus game feature to the player. The award sequences provide one or more awards to the player for play of the bonus game feature. More specifically, the one or more awards include at least the award values of the locked value-bearing symbols. In the example embodiment, the award sequence may be presented at step 124 such that the award values of the value-bearing symbols are provided to the player as an aggregated award. It is to be understood that although the term "aggregated award" is used, the award values are not necessarily combined prior to being added to a credit balance of the player but may be applied separately to the credit balance in at least some embodiments. In certain embodiments, the aggregated award values may be applied to the credit balance as a single value, but the animation of the award sequence may apply each award value separately to the player credit balance.

The display device may use one or more presentation elements and/or animations to convey the award sequences. In addition to the display device, the gaming machine may include other suitable components to convey the award sequences. For example, the gaming machine may include emotive lighting, speakers, vibration motors, and the like to engage the senses of the player. Any suitable combination of sensory presentation elements (including graphically displayed elements) may be used to convey the award sequence and are considered within the spirit and scope of the present disclosure.

FIGS. 5A-5G depict an example game interface 200 in a plurality of states of a bonus game feature similar to or the same as the bonus game feature described in FIG. 4. The game interface 200 may be presented by one or more display devices of a gaming machine (e.g., the gaming machine 10, shown in FIG. 1) and the bonus game feature may be conducted using game-logic circuitry in communication with the display device. In some embodiments, the game interface 200 may include additional, fewer, or alternative states in the example bonus game feature, including those described elsewhere herein.

In the example embodiment, the game interface 200 includes a plurality of symbol positions arranged in a symbol array 202. The symbol array 202 is organized into a plurality of columns and rows. Although the symbol array 202 is shown in a 3×5 arrangement of symbol positions, other suitable arrangements may be used. In an example base game similar to the game feature shown in FIG. 3, symbols populate each of the symbols from one or more sets of available symbols. In at least some embodiments, the symbols are randomly selected from reel strips including a plurality of symbols. Each symbol position may be associated with a respective reel strip, or a group of symbol positions may be associated with respective reel strips (e.g., a column of symbol positions is associated with one reel strip). The display device is configured to present animations and presentation elements associated with the population of the symbol positions and the awards for any winning outcomes.

In the example embodiment, the symbol array 202 may be selectively populated with value-bearing symbols. In some embodiments, in the base game, the award values of the value-bearing symbols may be automatically awarded when present in a game outcome. In other embodiments, the award values may be awards in response to one or more parameters, such as the value-bearing symbol being within a winning outcome. In certain embodiments, the value-bearing symbols are not part of winning outcomes and may not be awarded during the base game. The presence of the value-bearing symbols in the array 202 may be used to trigger the bonus game feature.

Figure 5A:
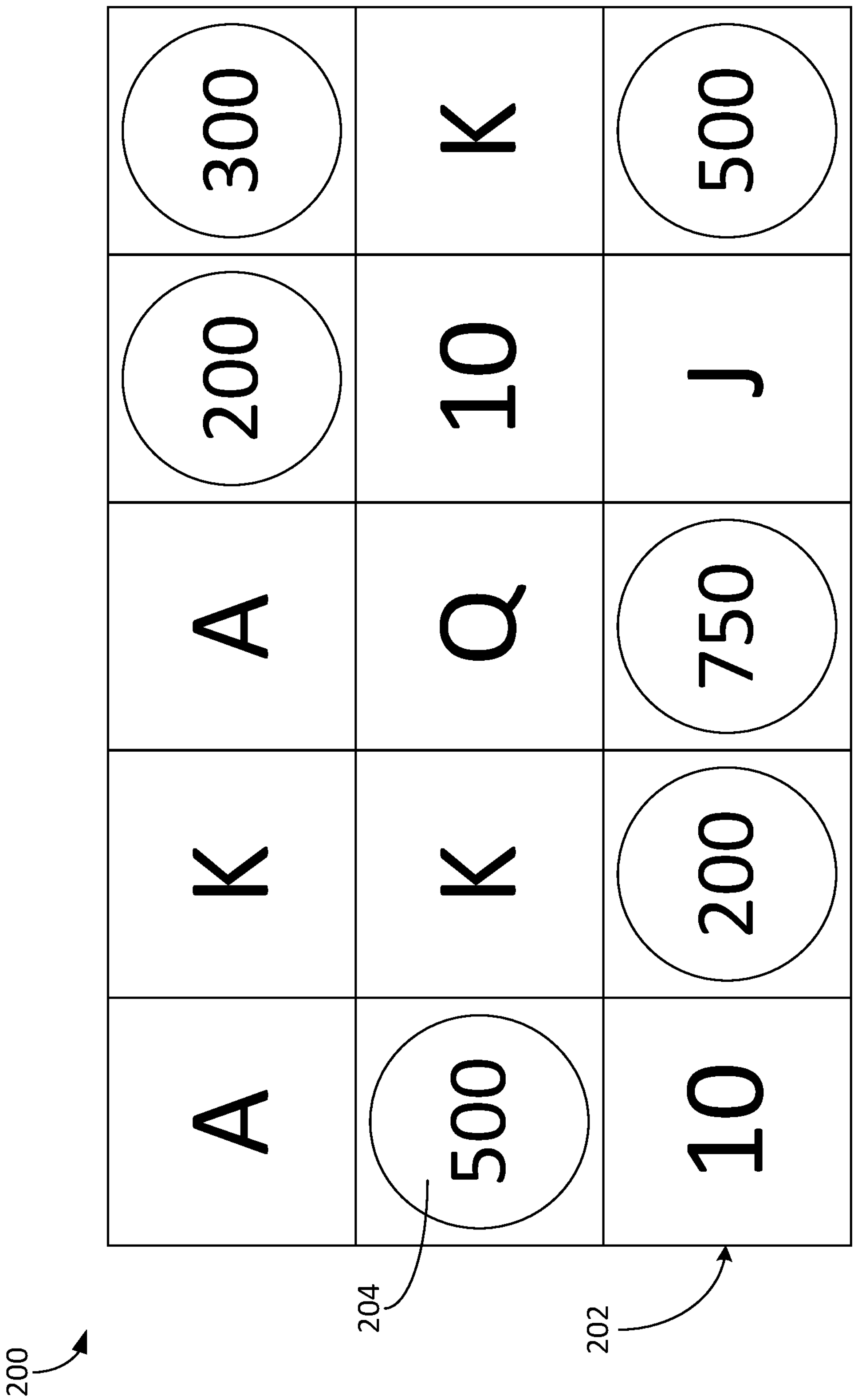
FIG. 5A is an example interface of the game feature of FIG. 4 in a first game state for triggering an example bonus game feature, according to one or more embodiments of the present disclosure.

FIG. 5A depicts the game interface 200 in a first state. More specifically, the first state is a transition from a base game feature to the bonus game feature. The array 202 is populated with a plurality of symbols, including a plurality of value-bearing symbols 204. Each value-bearing symbol 204 includes award indicia to identify an award value associated with the value-bearing symbol 204. In the example embodiment, the award indicia is a text-based indicator of the award value. In other embodiments, the award indicia may be presented in another suitable format. The award values of the value-bearing symbols 204 shown in FIG. 5A are for exemplary purposes only and are not intended to limit the value-bearing symbols 204 to the values shown. The value-bearing symbols 204 (and the other symbols within the array 202) are not limited to the visual appearance shown in FIGS. 5A-5G, but rather may be presented using any suitable presentation elements, themes, and the like.

To trigger the bonus game feature, the number of value-bearing symbols 204 in an outcome of the base game feature may be required to meet or exceed a threshold number. In the example embodiment, the trigger amount is six. In other embodiments, the trigger amount may be a different value and/or the trigger conditions may include other parameters, such as achieving threshold amounts relating to wagers, playtime, and/or the like. As shown in FIG. 5A, six value-bearing symbols 204 are present in the base game outcome, thereby triggering the bonus game feature.

Figure 5B:
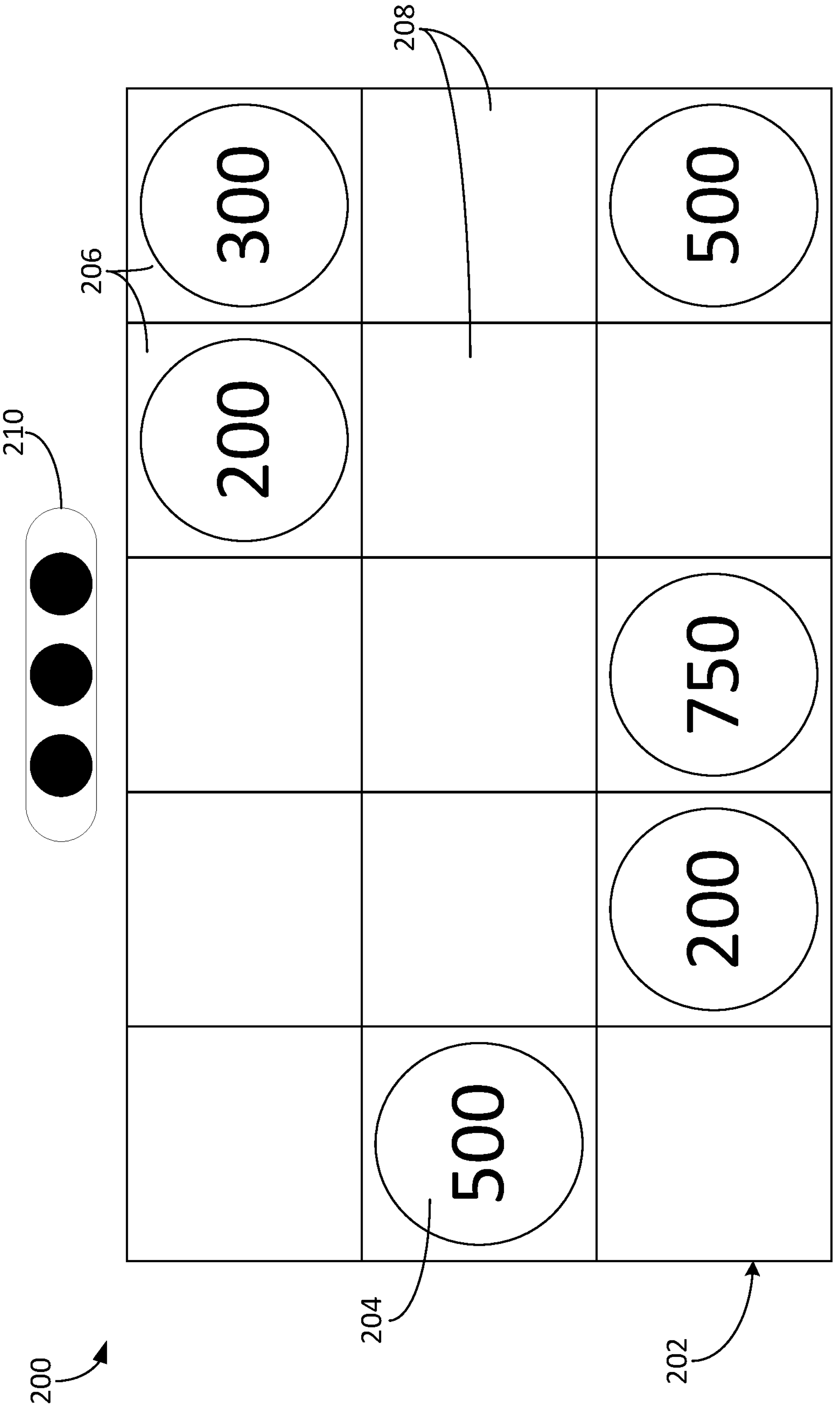
FIG. 5B is an example interface of the game feature of FIG. 4 in a second game state at an initialization of the bonus game feature, according to one or more embodiments of the present disclosure.

FIG. 5B depicts the game interface 200 in a second state at the initialization of the bonus game feature. The non-value-bearing symbols from the base game feature may be removed from the array 202 or otherwise change in visual appearance to indicate increased importance of the value-bearing symbols 204 in the bonus game feature. In other embodiments, such as embodiments that incorporate the use of non-value-bearing symbols in the bonus game feature, the visual appearance of the non-value-bearing symbols may remain the same.

The value-bearing symbols 204 may be "locked" into the respective symbol positions of the array 202 such that the value-bearing symbols 204 remain in the locked symbol positions for one or more subsequent game cycle outcomes. As used herein, locked symbol positions 206 refer to symbol positions occupied by a value-bearing symbol 204 (and therefore are not repopulated with other symbols during the bonus game feature), and unlocked symbol positions 208 refer to symbol positions available to receive new symbols. In the example embodiment, the value-bearing symbols 204 remain locked in the locked symbol positions 206 for the duration of the bonus game feature. As used herein, the term "preexisting value-bearing symbols 204" may refer to value-bearing symbols 204 that were locked into the symbol array 202 prior to the current game cycle outcome of the bonus game feature. In the example embodiment, the value-bearing symbols 204 are locked into the symbol positions that the value-bearing symbols 204 initially populated. However, in certain embodiments, the value-bearing symbols 204 may be shifted to other symbol positions to be locked. For example, the value-bearing symbols 204 may be shifted to occupy the lowest available symbol position in the corresponding column.

In the example embodiment, a game cycle counter 210 is initiated and presented. The presentation elements of the game cycle counter 210 are configured to convey a current count of the counter 210 to the player. In the illustrated embodiment, the counter 210 includes three indicators, where the visual appearance of the indicators reflects the current count as described herein. Other suitable presentations of the game cycle counter 210 (including presentations using additional or fewer indicators) are contemplated as within the spirit and scope of the present disclosure. The game cycle counter 210 may be presented in a plurality of suitable arrangements within the game interface 200, such as the illustrated arrangement above the symbol array 202.

In addition to the game cycle counter 210 being initiated, each unlocked symbol position 208 may be associated with a multiplier value. As described in detail herein, the multiplier values may be used to change the award value of new value-bearing symbols occupying one of the unlocked symbol positions 208. As the locked symbol positions 206 retain the same value-bearing symbol 204, no multiplier values may be generated for the locked symbol positions 206. In other embodiments, the locked symbol positions 206 may be selectively unlocked within the bonus game feature (e.g., the locked value-bearing symbol 204 is shifted to another symbol position), and a multiplier value is then assigned to the newly unlocked symbol position. In the example embodiment, the multiplier values are initiated at a 1× value. The multiplier values may not be visually represented until the multiplier values are updated to a value greater than 1× as described herein. In other embodiments, the visual representation of the multiplier values may be presented throughout the bonus game feature for active multiplier values (i.e., multiplier values associated with current unlocked symbol positions 208).

To generate a game cycle outcome, the unlocked symbol positions 208 are selectively populated with new value-bearing symbols 204. That is, each unlocked symbol position 208 may or may not be populated with new value-bearing symbols 204 for the game cycle outcome. The absence of value-bearing symbols 204 may be visually presented through populating the unlocked symbol positions 208 with non-value-bearing symbols or leaving the unlocked symbol positions 208 unpopulated, such as shown in FIG. 5B. The game interface 200 may include animations, such as a spinning animation, cycling through a plurality of available symbols (and voids) before stopping on the symbols or lack thereof that define the game cycle outcome.

Figure 5C:
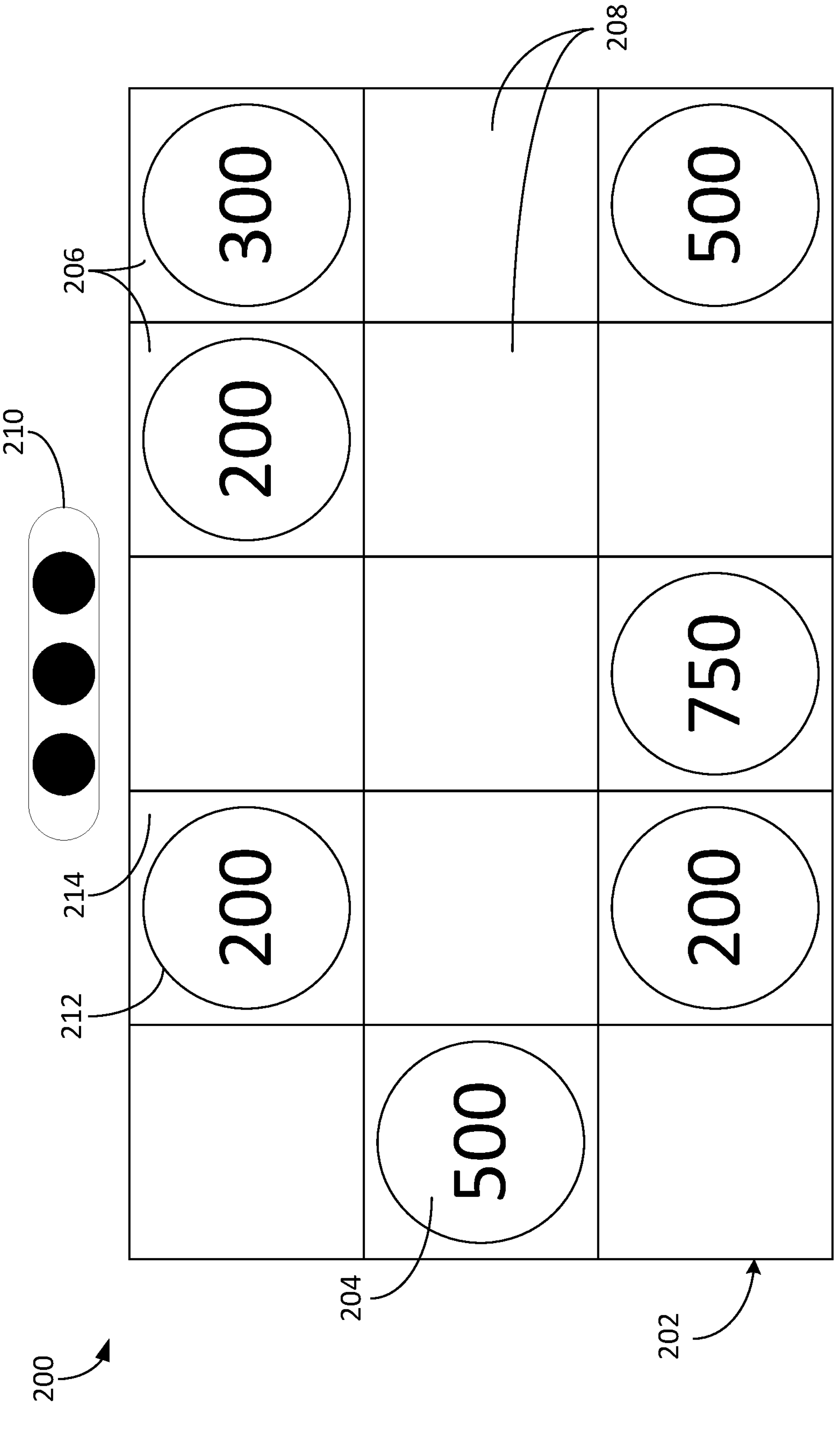
FIG. 5C is an example interface of the game feature of FIG. 4 in a third game state after a game cycle outcome including new value-bearing symbols, according to one or more embodiments of the present disclosure.
Figure 5D:
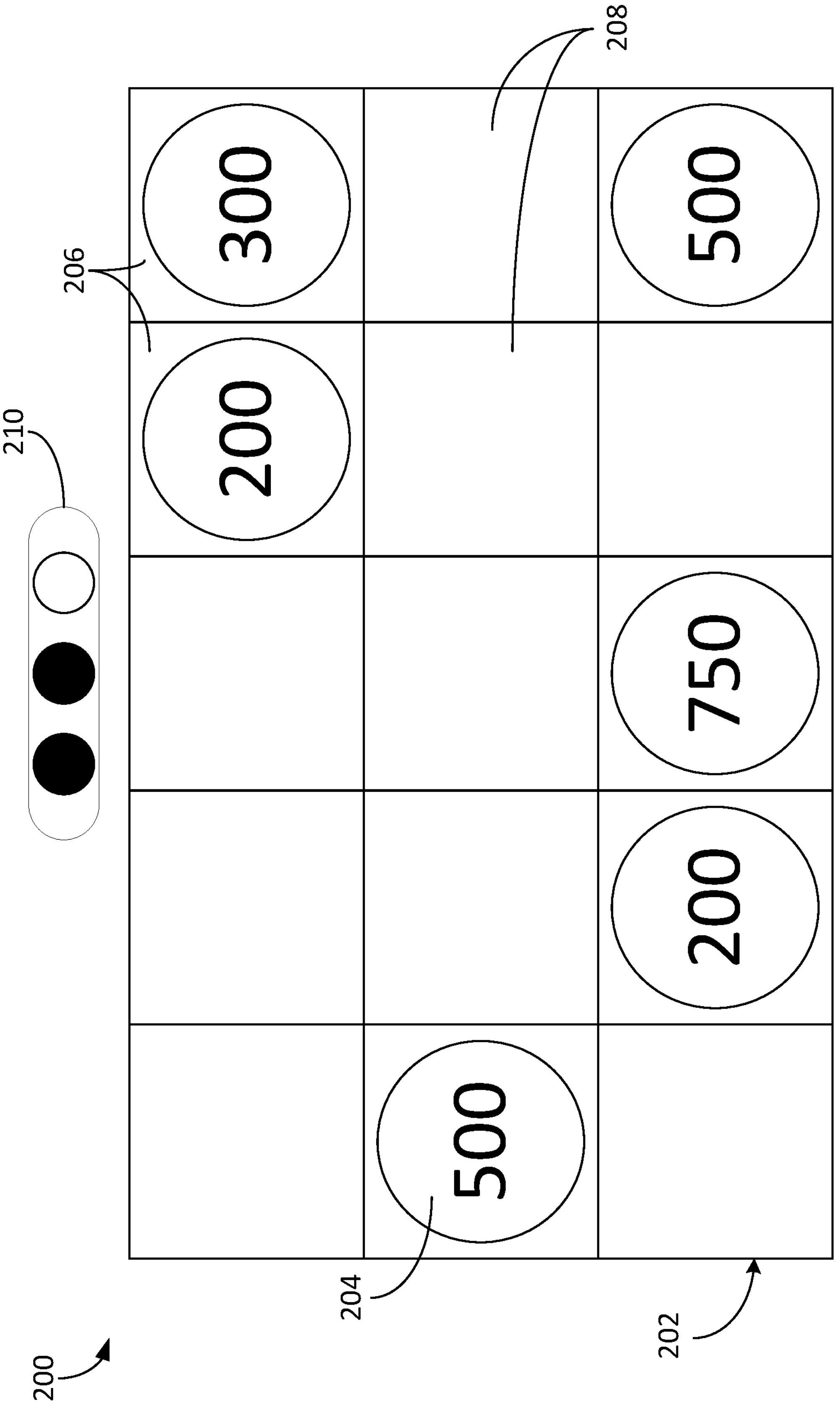
FIG. 5D is an example interface of the game feature of FIG. 4 in a fourth game state after a game cycle outcome with no new value-bearing symbols, according to one or more embodiments of the present disclosure.

FIGS. 5C and 5D depicts the game interface 200 a third state and a fourth state, respectively. The third and fourth states depicts two possible game cycle outcomes following the second state. More specifically, the third state follows a game cycle outcome including new value-bearing symbols 204, while the fourth state follows a game cycle outcome including no new value-bearing symbols 204. In reference to FIG. 4, the two states are examples of the branching steps off the determination in step 112.

With respect to FIG. 5C, a new value-bearing symbol 212 is presented in the first row, second column of the symbol array 202. All other unlocked symbol positions 208 remain unpopulated in this example. The award value of the value-bearing symbol may be random or partially random. For example, the award value may be randomly selected from a plurality of predefined award values (e.g., 200, 300, 500, and 750). In other embodiments, rather than the value-bearing symbols 204 having different initial award values, the value-bearing symbols 204 may have the same initial award value.

In the example embodiment, in response to the new value-bearing symbol 212, the game cycle counter 210 is reset to the initial counter value. That is, rather than decrementing from three filled indicators to two (as can be seen and described with respect to FIG. 5D), the game cycle counter 210 remains with all three indicators filled. The game cycle counter 210 may be reset to the initial counter value or another suitable value in response to any of the unlocked symbol positions being occupied by a new value-bearing symbol 212. In other embodiments, the game cycle counter 210 may reset in response to only a portion of the unlocked symbol positions 208 (including portions composed of a single position) being populated. In such embodiments, the portion of the unlocked symbol positions 208 may be highlighted or otherwise visually distinguished from the remaining unlocked symbol positions.

In the example embodiment, the new value-bearing symbol 212 is locked into the symbol position 214 occupied by the value-bearing symbol 212 in the game cycle outcome. As a result, the symbol position transitions from an unlocked symbol position 208 to a locked symbol position 206. Locking the value-bearing symbol 212 in the symbol position 214 includes multiplying the award value of the value-bearing symbol 212 by the multiplier value of the symbol position 214. In the example embodiment, the current multiplier value is 1×, and as a result, the award value of the value-bearing symbol 212 remains the same. The multiplier value is then removed or otherwise deactivated such that the multiplier value is only applied to the locked value-bearing symbol 212 once within the bonus game feature. In other embodiments, one or more trigger conditions may cause the multiplier value to be applied multiple times at the same or different value. For example, filling every symbol position with value-bearing symbols 204 may cause the multiplier values to be applied again. In other embodiments, other unlocked symbol positions 208 may receive and lock in the new value-bearing symbol 212. In such embodiments, the multiplier value of the receiving symbol position may be applied to the award value of the new value-bearing symbol 212.

With respect now to FIG. 5D, if no new value-bearing symbols 212 populate the unlocked symbol positions 208, the game cycle counter 210 is updated towards a termination count value. In the example embodiment, one of the three indicators of the game cycle counter 210 has been removed or visibly changed, indicating the current count of the game cycle counter 210 has decreased from three to two. The counter 210 may be configured to decrement before, during, or after the game cycle outcome is presented. When the counter 210 decrements may impact the number of game cycles available to receive a new value-bearing symbol 212. For example, if the counter 210 decrements after a game cycle outcome, the counter 210 may facilitate four consecutive game cycle outcomes without value-bearing symbols 212. In such an example, the multiplier value may not change for one or more game cycles from the initial, 1× value. Decrementing the counter 210 prior to or during presentation of the game cycle outcome may facilitate three consecutive game cycle outcomes without value-bearing symbols 212 instead of four.

Figure 5E:
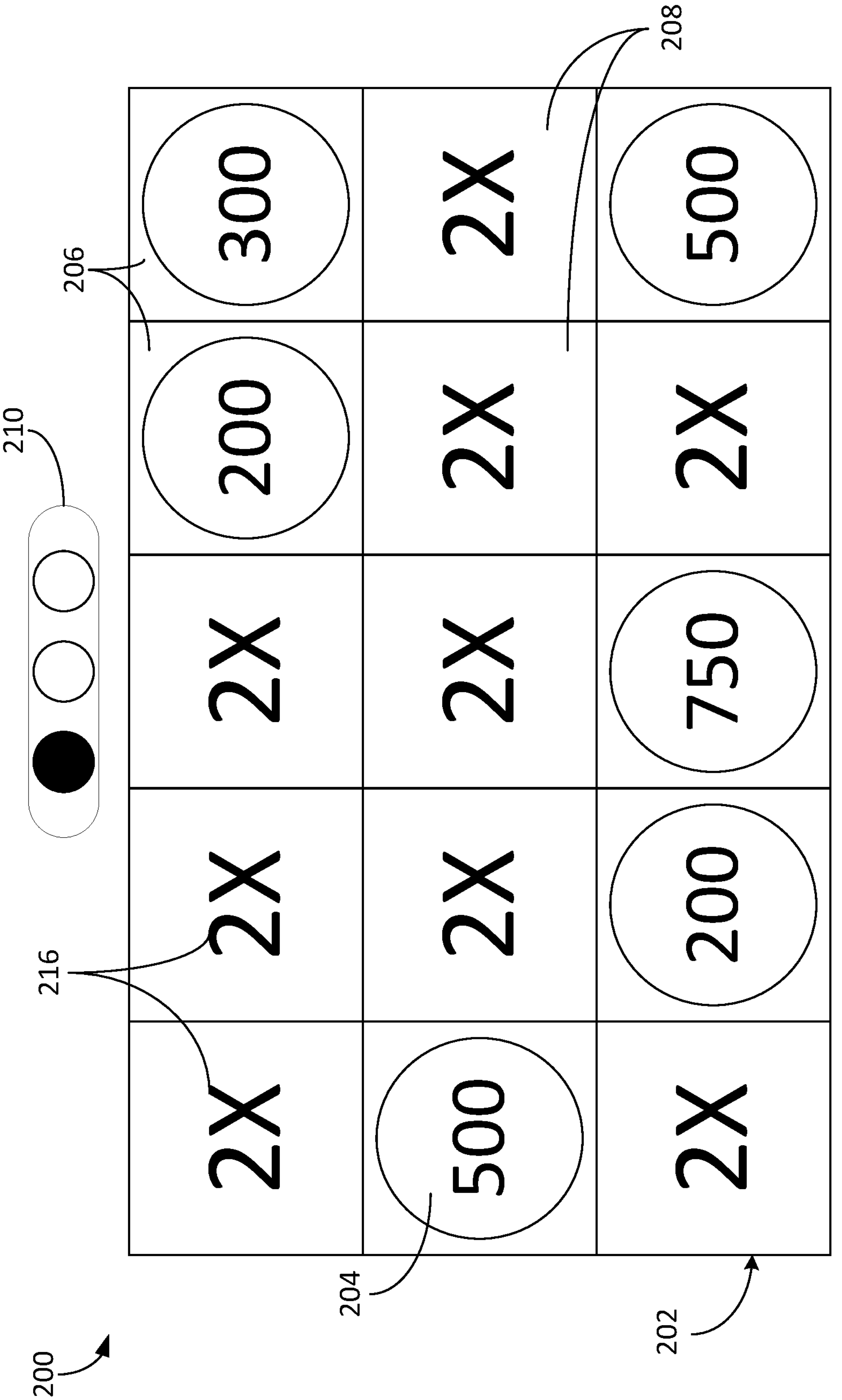
FIG. 5E is an example interface of the game feature of FIG. 4 in a fifth game state after a second consecutive game cycle outcome with no new value-bearing symbols, according to one or more embodiments of the present disclosure.

FIG. 5E depicts the game interface in an example fifth state following a subsequent game cycle outcome from the fourth state. More specifically, no new value-bearing symbols have populated the unlocked symbol positions 208. Accordingly, the current count of the game cycle counter 210 is updated by removing or visibly changing another indicator, thereby leaving one indicator full.

In addition to updating the game cycle counter 210, the multiplier values of the unlocked symbol positions are updated. In at least some embodiments, the multiplier values are updated at least partially as a function of the current count of the game cycle counter 210. In one example, the multiplier values are selected from a set of available multiplier values based on the current count of the game cycle counter. In the example embodiment, the set of available multiplier values include 1×, 2×, and 5× multiplier values, where the multiplier value increases as the game cycle counter decreases. In other embodiments, the multiplier values may be calculated based on the current count of the game cycle counter 210.

In the example embodiment, to convey the multiplier values to the player, multiplier indicia 216 are presented for each of the unlocked symbol positions. The multiplier indicia 216 may be any suitable visual presentation element for indicating the effect of the multiplier values as described herein. For example, and without limitation, the multiplier indicia 216 may include text, borders, backgrounds, graphical elements, animations, and/or other suitable presentation elements to represent the multiplier values. The multiplier indicia 216 may be separate for each unlocked symbol position or grouped together, such as for adjacent symbol positions having the same multiplier value. In the example embodiment, with two indicators removed or empty from the game cycle counter 210, the multiplier value is updated from 1× to 2× for all of the unlocked symbol positions 208, and the multiplier indicia 216 is presented. In other embodiments, the unlocked symbol positions 208 may not have the same multiplier value and may be updated separately. For example, in response to the game cycle counter 210 decrementing, only a portion of the symbol positions 208 may have the corresponding multiplier values updated.

Figure 5F:
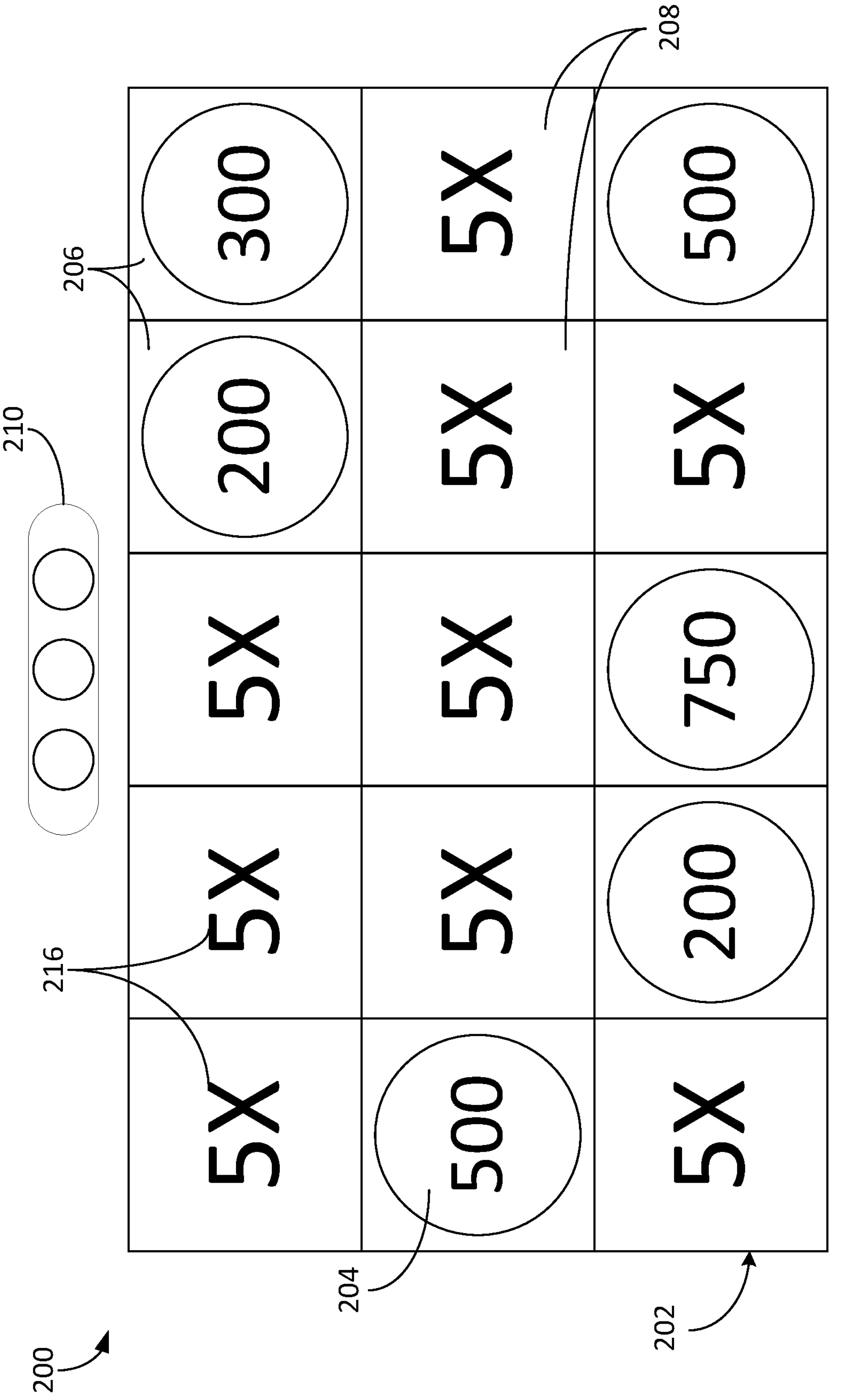
FIG. 5F is an example interface of the game feature of FIG. 4 in a sixth game state after a third consecutive game cycle outcome with no new value-bearing symbols, according to one or more embodiments of the present disclosure.

FIG. 5F depicts the game interface in an example sixth state following a subsequent game cycle outcome from the fifth state. More specifically, no new value-bearing symbols have populated the unlocked symbol positions 208. Accordingly, the current count of the game cycle counter 210 is updated by removing or visibly changing another indicator, thereby leaving all of the indicators removed or empty.

Similar to the transition between the fourth and fifth state, the game cycle counter 210 and the multiplier values of the remaining unlocked symbol positions 208 are updated in response to the absence of new value-bearing symbols. The multiplier values are increased from 2× to 5× in this example, and the multiplier indicia 216 are updated accordingly. At the sixth state, at least one more game cycle outcome is guaranteed in the bonus game feature. If the next game cycle outcome does not result in the game cycle counter 210 resetting (e.g., due to no new value-bearing symbols added to the symbol array 202), the bonus game feature may conclude and award the player for the locked value-bearing symbols present within the symbol array 202. In certain embodiments, the award sequence for the locked value-bearing symbols may not be automatic at the conclusion of the bonus game feature, but rather may require one or more award conditions to receive the award (e.g., achieve a threshold number of value-bearing symbols in a row, column, and/or the array as a whole).

Figure 5G:
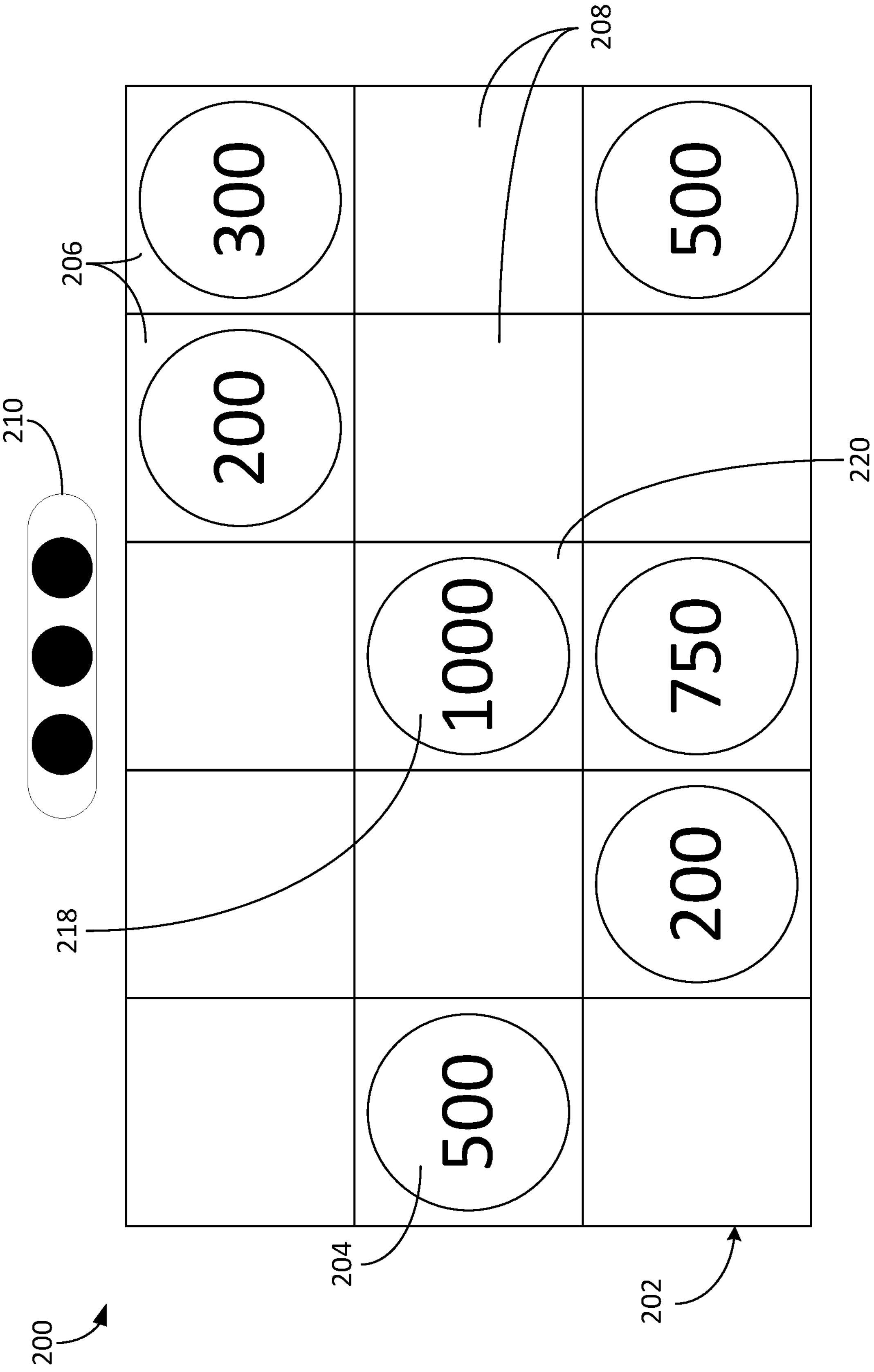
FIG. 5G is an example interface of the game feature of FIG. 4 in a seventh game state after a game cycle outcome with new value-bearing symbols enhanced by multiplier values, according to one or more embodiments of the present disclosure.

FIG. 5G depicts the game interface in a seventh state following a game cycle outcome after the sixth state. More specifically, a new value-bearing symbol 218 has populated the symbol array 202, thereby resetting the game cycle counter 210 to the initial counter value and continuing the bonus feature game. In addition to the resetting the game cycle counter 210, the multiplier values for the remaining multiplier values may be reset to 1×. In the example embodiment, the multiplier indicia 216 are hidden or removed from the interface 200 while the multiplier values are 1×. In other embodiments, the multiplier indicia 216 may be continuous shown and updated with the multiplier values.

The new value-bearing symbol 218 is locked into the symbol position 220 and the award value is updated based on the current multiplier value. In the example embodiment, the initial award value of the new value-bearing symbol 218 is 200, and the current multiplier value was 5× as seen in FIG. 5F. Accordingly, combining the initial award value and the current multiplier value caused the new value-bearing symbol to be updated to an award value of 1000. The interface 200 may include presentation elements and/or animations to convey the change in award value to the player. For example, the multiplier indicia 216 may temporarily be overlaid with the new value-bearing symbol 218, where both the initial award value and the multiplier indicia 216 are both visible. An animation to update the award value may remove the multiplier indicia 216 and depict the award value increasing to the new, updated award value.

In some embodiments, the number of new value-bearing symbols added to the symbol array 202 throughout the bonus game feature is random based on the random determinations in generating each game cycle outcome. In other embodiments, the number of new value-bearing symbols may be based on random determinations other than the game cycle outcome generation such that one or more game cycle outcomes are at least partially predetermined based on the prior random determinations.

Figure 6:
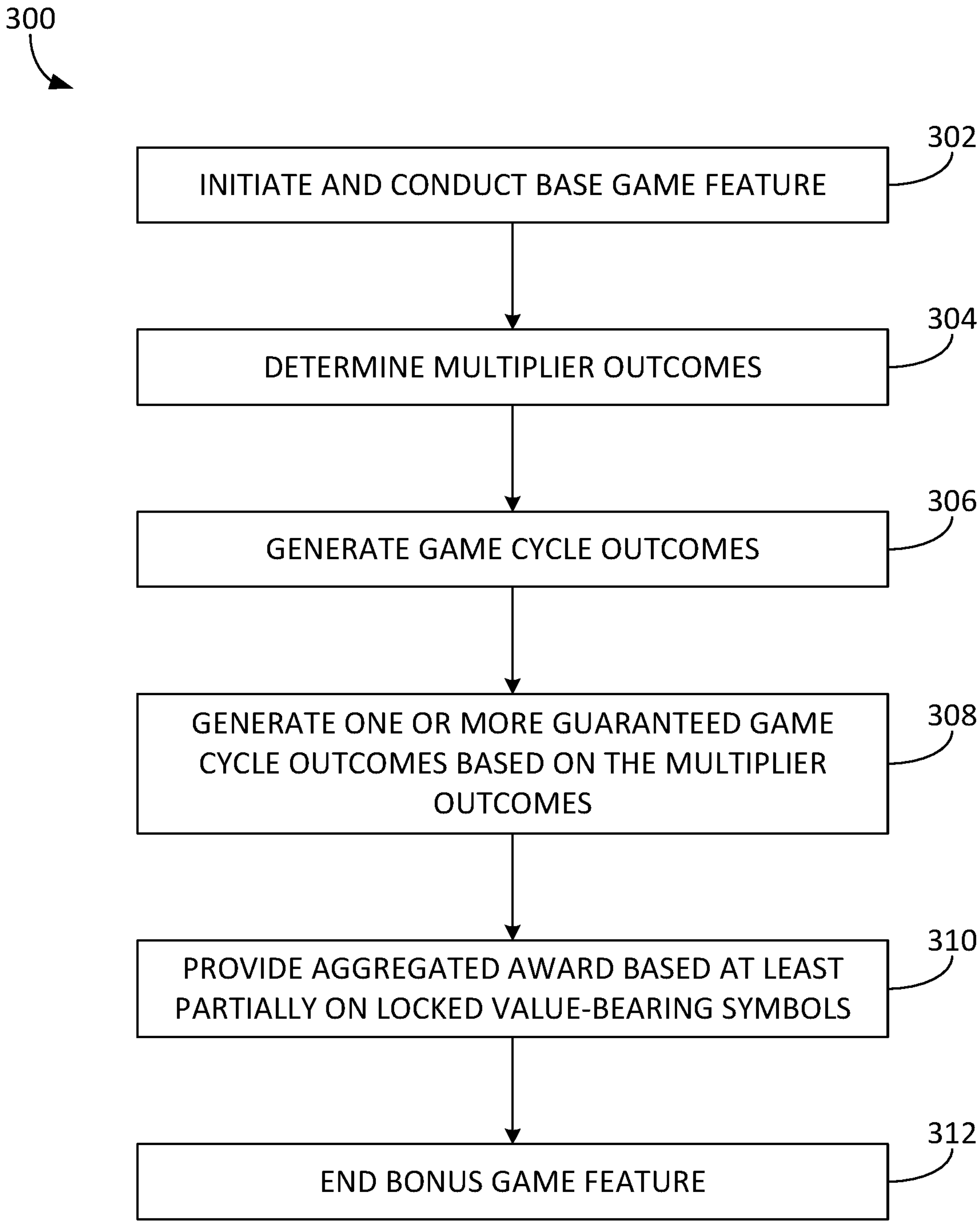
FIG. 6 is a flow diagram of an example method for conducting a game feature using multiplier outcomes, according to one or more embodiments of the present disclosure.

FIG. 6 is a flow diagram of an example method 300 for determining game outcomes within a bonus game feature similar to the feature described in FIGS. 4-5G. The method 300 may be at least partially performed by the game-logic circuitry of the gaming machine, which may cause one or more display devices to display presentation elements for the game based on the steps described herein. In other embodiments, the method 300 may include additional, fewer, or alternative steps, including those described elsewhere herein.

At step 302, the bonus game feature is initiated. Initiating the bonus game feature may include, for example, detecting a trigger condition in the base game feature, locking any preexisting value-bearing symbols in the symbol positions, initiating multiplier values for unlocked symbol positions, and/or initiating a game cycle counter.

At step 304, the game-logic circuitry determines multiplier outcomes for the bonus game feature based on one or more random outcomes (e.g., from a random number generator). The multiplier outcomes indicate at least how many value-bearing symbols will populate the symbol array in the bonus game feature. In the example embodiment, the multiplier outcomes further indicate the number of value-bearing symbols to populate the symbol array at a given multiplier value. For example, if the three available multiplier values are 1×, 2×, and 5×, the multiplier outcomes may indicate that three value-bearing symbols will be added at 1×, no value-bearing symbols at 2×, and two value-bearing symbols will be added at 5× throughout the bonus game feature. Notably, in the example embodiment, the initial award value and symbol position of each value-bearing symbol may not be predetermined, but rather are randomly determined in the game cycle outcome determinations described herein. In other embodiments, the initial value, symbol position, and/or game cycle outcome of each value-bearing symbol may be determined as part of the multiplier outcomes.

The multiplier outcome may be randomly selected from one or more weighted tables of multiplier outcomes. The weighted tables define or link the underlying random outcomes or determinations to different multiplier outcomes. For example, a random number generator of the game-logic circuitry may be configured to generate random values within a range of values, and the weighted table may define different multiplier outcomes associated with different subsets of values within the range of random values. In some embodiments, a plurality of weighted tables is available for a plurality of different states. The states may be based on one or more game parameters, such as the number of trigger symbols (e.g., value-bearing symbols) that initiate the bonus game feature. For example, initiating the bonus game feature with six trigger symbols may have a first weighted table for determining a multiplier outcome, whereas initiating the bonus game feature with seven trigger symbols may have a second weighted table different from the first table.

At step 306, the game-logic circuitry proceeds to generate game cycle outcomes. The game cycle outcomes may be based on one or more random outcomes separate from the multiplier outcomes, such as the location and/or initial award value of any value-bearing symbols within a game cycle outcome. At step 308, which may occur prior to, during, or after the game cycle outcomes of step 306 are generated, the game-logic circuitry may generate one or more guaranteed game cycle outcomes based on the multiplier outcomes. The guaranteed game cycle outcomes may be generated to facilitate compliance between the game cycle outcomes to the number of value-bearing symbols to be added and at which multiplier value as established by the multiplier outcomes. The guaranteed game cycle outcomes may be fully predefined by the multiplier outcomes or partially predefined (e.g., position and initial award value are randomly generated for any new value-bearing symbols). The guaranteed game cycle outcomes are not necessarily limited to outcomes with new value-bearing symbols but may also include outcomes without value-bearing symbols to increase the multiplier values and/or to conclude the bonus game feature after the multiplier outcomes have been satisfied. In certain embodiments, the multiplier outcomes and the corresponding guaranteed game cycle outcomes only define a threshold number of value-bearing symbols to be awarded during the bonus game feature, and additional value-bearing symbols may be randomly awarded through the bonus game feature within the game cycle outcomes generated at step 306.

The game cycle outcomes of steps 306 and 308 may be generated as whole prior to the presentation of the game cycle outcomes in some embodiments given the relative speed of generating game outcomes. In certain embodiments, At step 310, one or more termination conditions of the bonus game feature have been met, and an award sequence for providing an aggregated award is initiated. Within the underlying game logic, the award values of the value-bearing symbols may be aggregated throughout the bonus game feature or at the conclusion of the bonus game feature. After the aggregated award is provided to the player, the bonus game feature may conclude at step 312, and the base game feature is resumed.

The foregoing systems and methods describe the use of dynamic multipliers and value-bearing symbols based on a counter and irrespective of location within a symbol array. In other embodiments, the dynamic multipliers may be region-specific within a symbol array with or without a counter defining the length of the bonus game feature. It is to be understood that although the embodiments described herein may differ from the embodiments described above with respect to FIGS. 4-6, at least some embodiments may incorporate elements of any of the example embodiments described in the present disclosure and are considered within the spirit and scope of the present disclosure. For example, the following embodiments may include a game cycle counter that may be reset in response to the presence of new value-bearing symbols. In another example, the trigger value-bearing symbols described herein may be used in the embodiments described with respect to FIGS. 4-6 to adjust the multiplier values of the unlocked symbol positions.

Figure 7:
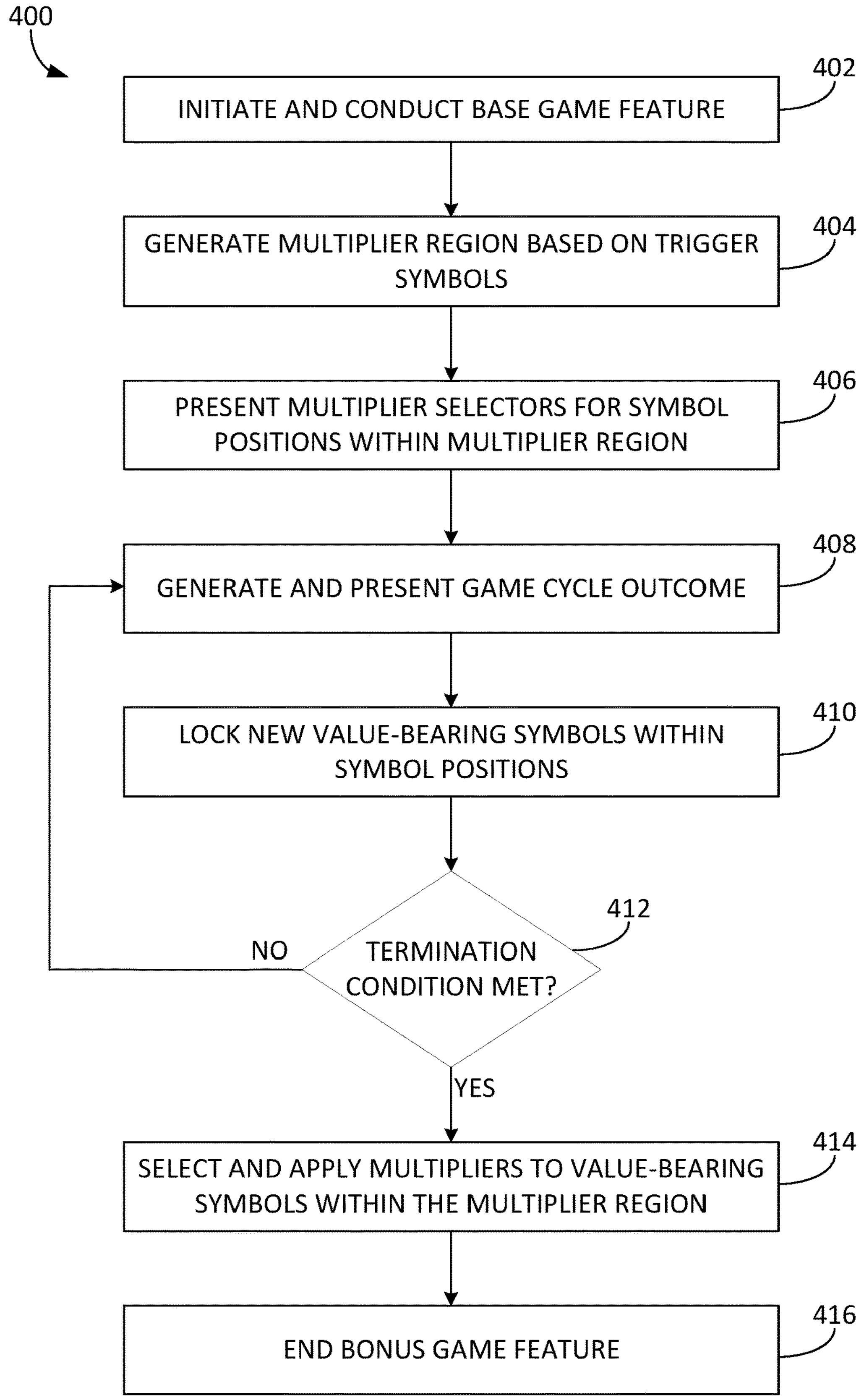
FIG. 7 is a flow diagram of an example method for conducting a game feature including dynamic modifiers and active modifier regions, according to one or more embodiments of the present disclosure.

FIG. 7 is a flow diagram of an example method 400 for conducting and presenting an example bonus game feature including dynamic modifiers and value-bearing symbols. The method 400 may be performed at least partially by game-logic circuitry (e.g., the game-logic circuitry 40, shown in FIG. 2) in communication with one or more display devices of a gaming machine (e.g., the gaming machine 10, shown in FIG. 1). In other embodiments, the method 400 may be at least partially performed by another suitable device and/or include additional, fewer, or alternative steps, including those described elsewhere herein.

In the example embodiment, at step 402, a bonus game feature is initiated. The bonus game feature may be initiated in response to one or more conditions or events associated with a base game feature, such as a base game outcome including a number of value-bearing symbols meeting or exceeding a trigger threshold. In one example, the trigger threshold may be three or more value-bearing symbols within a base game outcome. In certain embodiments, the base game feature and the bonus game feature both incorporate a plurality of symbol positions that are selectively populated by symbols (including value-bearing symbols). In other embodiments, the bonus game feature may include presenting symbol positions according to a predefined configuration (e.g., a symbol array) to facilitate the features and functions of the bonus game feature as described herein.

Initiating the bonus game feature may include causing the display device to lock any preexisting value-bearing symbols from the base game feature within the symbol array. In at least some embodiments, the value-bearing symbols may include a number of trigger value-bearing symbols for generating multipliers as described herein. In certain embodiments, other non-value-bearing symbols may be used to generate the multipliers as described herein. In such embodiments, the trigger non-value-bearing symbols may persist within the symbol positions at least until a region associated with the multipliers is defined.

At step 404, the game-logic circuitry defines one or more multiplier regions within the plurality of symbol positions for generating multipliers. The multiplier region may include at least one symbol position (and potentially up to all symbol positions) and is composed of one or more subregions, where the subregions may overlap each other. Each subregion is generated based on a trigger symbol from the initiation of the bonus game feature. The trigger symbol may be present from the base game outcome triggering the bonus game feature or may be applied at step 402 during initiation of the bonus game feature. In certain embodiments, rather than symbols populating the symbol positions, the trigger symbols may be tracked and stored in a separate counter, which may be display in combination with the symbol positions.

In the example embodiment, at least a portion of the value-bearing symbols may act as trigger symbols. The trigger symbols may be visually distinguished from non-trigger symbols, such as through different colors, borders, presentation elements, and the like. In certain embodiments, all of the value-bearing symbols may act as trigger symbols. In such embodiments, only the value-bearing symbols present at the initiation of the bonus game feature may be used to define the multiplier region, while other embodiments may facilitate a dynamic multiplier region throughout the bonus game feature based on new value-bearing symbols within the symbol positions. The multiplier region and/or the multiplier subregions may be randomly selected from a weighted table of a plurality of available multiplier regions and/or subregions based on the number of trigger symbols. That is, different weighted tables may be used for different amounts of trigger symbols.

For each trigger symbol, a subregion is established within the plurality of symbol positions. The subregions include one or more symbol positions. The symbol positions, shape, and/or size of the subregions may be at least partially random. For example, a subregion may be randomly selected from a plurality of available subregions associated with the trigger symbol. At step 406, the display device presents multiplier selectors for symbol positions within the subregions of the multiplier region. Each multiplier selector may be associated with a respective symbol position or group of symbol positions (e.g., one multiplier selector may be used for an entire multiplier region). The multiplier selector may visually present a plurality of available multiplier values that may be applied to value-bearing symbols occupying the associated one or more symbol positions.

The multiplier selectors may be configured to initiate at a predefined set of available multiplier values. However, for symbol positions within two or more multiplier subregions, the available multiplier values may increase in value and/or increase in number of available multiplier values based on the number of overlapping multiplier regions. In one example, the multiplier values for a given symbol position may initiate at 1×, 2×, and 3× and increase to 2×, 3×, and 5× in response to the symbol position being within two multiplier subregions. In another example, rather than increasing the value of the multipliers, the set of available multipliers may be updated to 1×, 2×, 3×, and 5×.

In some embodiments, to present the multiplier region and the multiplier selectors, each multiplier subregion may be applied to the symbol positions sequentially, where applying the multiplier subregion may include visually distinguishing between symbol positions within and outside of the multiplier region. The multiplier selectors are presented in the symbol positions of each subregion and, as overlapping subregions are applied, the multiplier values of the multiplier selectors may be updated. In other embodiments, other suitable animation and/or presentation elements may be used to convey the application of the multiplier region and the multiplier selectors. For example, rather than visually applying the subregions separately, the multiplier region as a whole may be visually applied to the symbol positions.

As the multiplier region is formed from the subregions, the borders between different subregions may be removed such that the multiplier region may appear to be a single, continuous group of symbol positions. The evidence of any overlapping subregions in such an embodiment may be found in the varying sets of multiplier values of the multiplier selectors. In other embodiments, at least some presentation elements and/or animations may be used to distinguish between subregions. In one example, the symbol positions may be distinguished within a "heat map," where symbol positions have a different color, border, and/or the like based on the number of overlapping subregions.

Unlike the prior embodiments in which multiplier values are only applicable to new value-bearing symbols added within the bonus game feature to the symbol positions, the multiplier region and the multiplier selectors may be applied to preexisting value-bearing symbols within the symbol positions. In certain embodiments, the multiplier region may be guaranteed to include at least one preexisting value-bearing symbol and/or new value-bearing symbol.

At step 408, the game-logic circuitry generates a game cycle outcome and causes the display device to present the game cycle outcome. The game cycle outcome includes selectively and randomly populating unlocked symbol positions with value-bearing symbols. That is, each unlocked symbol position may or may not be populated with a new value-bearing symbol. A symbol position not populated with a value-bearing symbol may be populated with a non-value-bearing symbol or left unoccupied (sometimes referred to herein as populated by a "void"). The animation of the game cycle outcome may include a plurality of available symbols and/or voids rotating, spinning, or otherwise temporarily occupying the unlocked symbols before landing on the symbol or void specified by the game cycle outcome.

At step 410, any new value-bearing symbols from the game cycle outcome are locked within the symbol positions. Locking the new value-bearing symbols within the symbol positions may include any suitable animations and/or presentation elements to convey to the player the value-bearing symbols will remain for at least one or more subsequent outcomes. In some embodiments, the new value-bearing symbols are locked into the respective symbol positions each new value-bearing symbol occupies in the game cycle outcome. In other embodiments, the new value-bearing symbols may be shifted to other symbol positions to be locked for one or more subsequent game cycle outcomes. In one example, one or more new value-bearing symbols may be shifted into or out of the multiplier region. In certain embodiments, only new value-bearing symbols occupying the multiplier region are locked into the symbol positions such that symbol positions external to the multiplier region are repopulated irrespective of the types of symbols within the external symbol positions.

At step 412, the game-logic circuitry determines whether or not one or more termination conditions have been met for the bonus game feature. The termination conditions may include, but are not limited to, reaching a predefined threshold number of game cycle outcomes, reaching a threshold number of game cycle outcomes without new value-bearing symbols (consecutive outcomes or otherwise), no remaining unlocked symbol positions available, and the like. In some embodiments, the bonus game feature is configured to have a predefined length (e.g., N number of game cycle outcomes). The length of the bonus game feature may be adjusted at the initiation of the bonus game feature, such as based on the number of trigger symbols or value-bearing symbols. In other embodiments, the length of the bonus game feature is dynamic and may continue or terminate based on the game cycle outcomes. In such embodiments, the length of the bonus game feature may last at least a predetermined minimum number of game cycles and/or up to a predetermined maximum number of game cycles.

If the termination conditions have not been met, the game-logic circuitry causes another game cycle outcome to be generated and continue steps 408-412 until the termination conditions are met. In response to meeting the termination conditions, the game-logic circuitry applies multiplier values to the value-bearing symbols within the multiplier region at step 414. More specifically, for each value-bearing symbol within the multiplier region, a multiplier value is selected from the multiplier selector of the symbol position occupied by the value-bearing symbol. The multiplier value selection may be random, partially random, predetermined, and/or manual (e.g., the player is given the option to select the multiplier). The selected multiplier is then applied to the award value of the value-bearing symbol. Application of the multiplier may include mathematical operations, such as multiplication, and/or selecting a new award value from a plurality of available award values based on the multiplier.

For symbol positions within the multiplier region that are unpopulated by value-bearing symbols, the multipliers are removed. The value-bearing symbols external to the multiplier region may remain in the symbol positions, but the corresponding award values remain the same. In certain embodiments, play of the bonus game feature and/or player input may enable one or more external value-bearing symbols to be shifted within the multiplier region. For example, trigger value-bearing symbols may be shifted within the multiplier region.

The display device may be configured to present one or more presentation elements and/or animations associated with the multiplier selectors and the features of step 414. For example, through the game cycle outcomes, the multiplier selectors may be animated to cycle the available multiplier values using any suitable animation schemes (e.g., spinning through the values, highlight values according to a sequence, etc.). Selection of a multiplier value may include the selected multiplier value being highlighted or otherwise visually distinguished from the other available multiplier values before updating the award value of the associated value-bearing symbol. The multiplier selectors may be visually hidden, removed, or changed in response to selecting and applying a multiplier value. The award indicia of the value-bearing symbols within the multiplier region may be updated to reflect the new award values, which may include animations convey the change in award value.

In the example embodiment, at step 416, the game-logic circuitry ends the bonus game feature with an awards sequence to provide an aggregated award at least partially based on the award values indicated by the value-bearing symbols. The award values may be individually or collectively applied to a credit balance of the player through one or more animations. The animations may include, for example, the award value of a given value-bearing symbol being added to the credit balance (or a running total of the aggregated award) while the value-bearing symbol is removed from the corresponding symbol position. After the award sequence is complete, the bonus game feature may conclude, and the base game feature may resume. In other embodiments, the bonus game feature may continue in a different state.

FIGS. 8A-8H depict an example game interface 500 for an example bonus game feature similar to the bonus game feature described with respect to FIG. 7. The game interface 500 may be presented by one or more display devices of gaming machine in communication with game-logic circuitry. It is to be understood that the following presentation elements and/or animations described herein with respect to FIGS. 8A-8H are for illustrative purposes only and are not intended to be limited to the embodiments described herein. Other suitable presentation elements, animations, and/or other sensory elements (including those provided by other devices of the gaming machine, such as an emotive lighting system) coordinated with the aspects of the bonus game feature described herein are considered within the spirit and scope of the present disclosure.

Figure 8A:
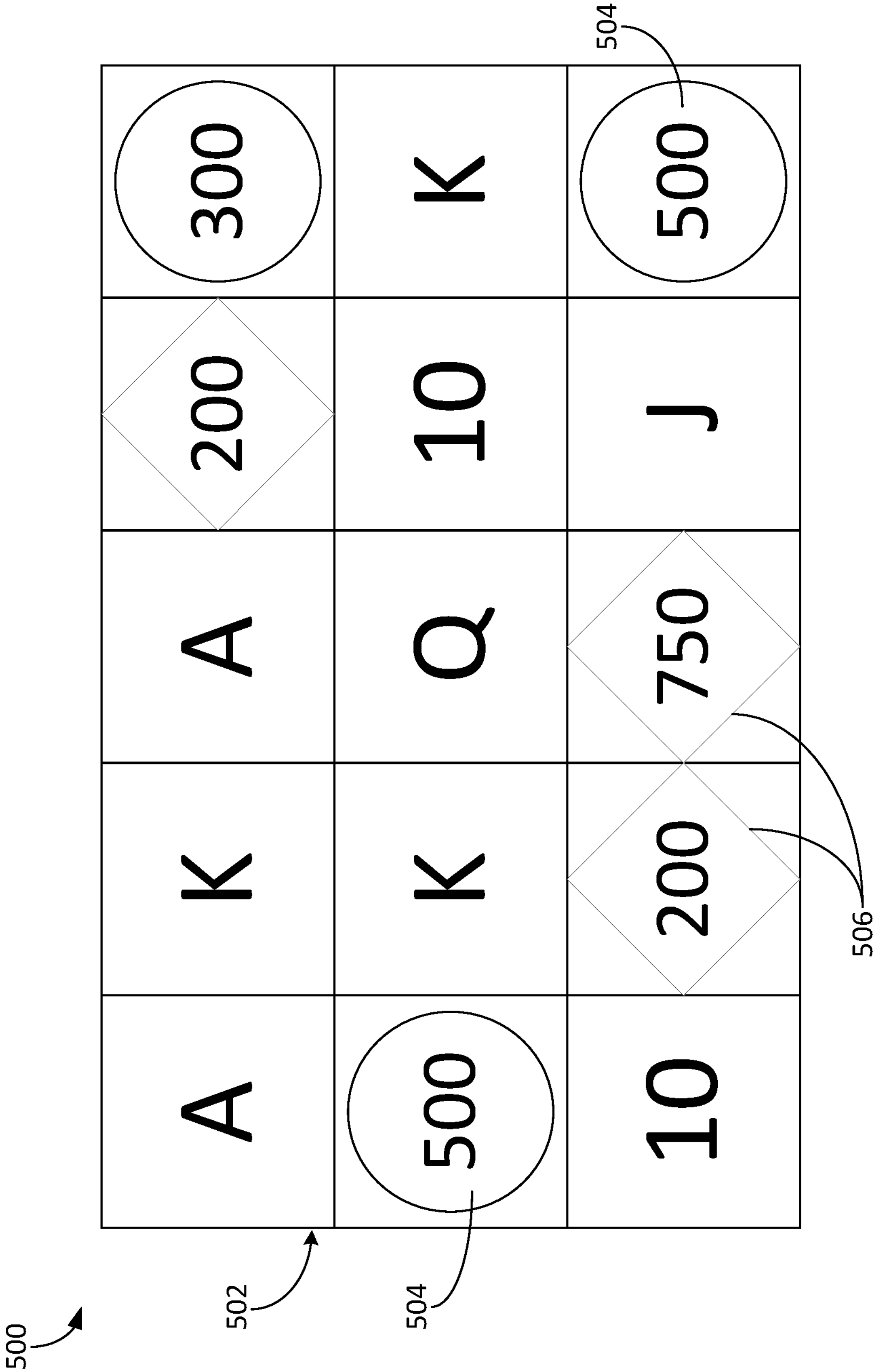
FIG. 8A is an example game interface of the game feature of FIG. 7 in a first game state, according to one or more embodiments of the present disclosure.

FIG. 8A depicts the game interface 500 in a first state. More specifically, the first state is a base game outcome that triggers the bonus game feature. The game interface 500 includes a plurality of symbol positions arranged in a symbol array 502. The symbol array 502 includes three rows and five columns in the example embodiment, though other suitable arrangements of the array 502 may be used in other embodiments.

The symbol positions are selectively populated with randomly selected symbols. The symbols may be selected from reel strips, and each reel strip may be associated with one or more symbol positions (e.g., a column of symbol positions is associated with one reel strip). In the example embodiment, six value-bearing symbols 504 populate the array 502 in the base game outcome. The value-bearing symbols 504 may have different award values as indicated by the respective award indicia or the same, initial award value. In certain embodiments, the value-bearing symbols 504 may be incorporated into winning outcomes of the base game, while other embodiments the value-bearing symbols 504 are not incorporated into any winning outcomes of the base game.

Among the six value-bearing symbols 504, three trigger value-bearing symbols 506 are present in the base game outcome. The trigger value-bearing symbols 506 are represented as diamonds while non-trigger value-bearing symbols 504 are represented as circles in FIG. 8A, though other suitable visual distinctions may be used. In certain embodiments, every value-bearing 504 is a trigger value-bearing symbol 506, and therefore no visual distinction beyond the award values is provided between the value-bearing symbols 504. In certain embodiments, the trigger value-bearing symbols 506 may be revealed or selected in response to initiating the bonus game feature. That is, one or more value-bearing symbols 504 may be visually changed to trigger value-bearing symbols within the bonus game feature.

In at least some embodiments, the trigger condition for the bonus game feature may include meeting or exceeding a predetermined threshold number of value-bearing symbols 504 and/or trigger value-bearing symbols 506 in a base game outcome. For example, the predetermined threshold may be six value-bearing symbols 504 (including the trigger value-bearing symbols 506) and/or three trigger value-bearing symbols 506. In other embodiments, additional and/or alternative trigger conditions may be required to initiate the bonus game feature, such as trigger conditions relating to wager or play history of the base game feature.

The bonus game feature may include locking the preexisting value-bearing symbols 504, 506 from the base game outcome in FIG. 8A into the array 502. In certain embodiments, the other, non-value-bearing symbols may be removed from the array 502. In other embodiments, the non-value-bearing symbols may remain within the array 502 such that the voids shown in following figures may be populated instead with non-value-bearing symbols.

Figure 8B:
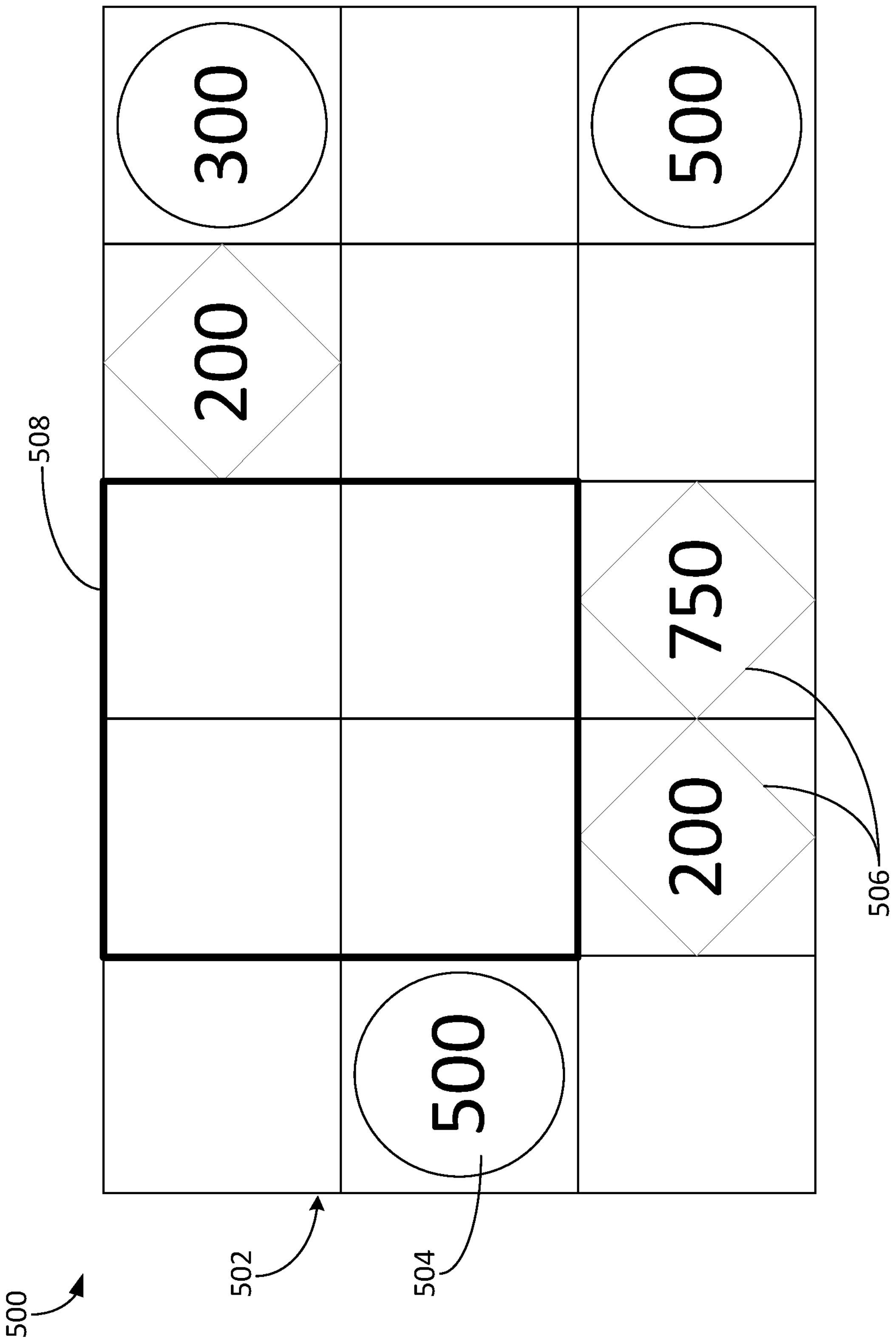
FIG. 8B is an example game interface of the game feature of FIG. 7 with a first multiplier subregion, according to one or more embodiments of the present disclosure.
Figure 8C:
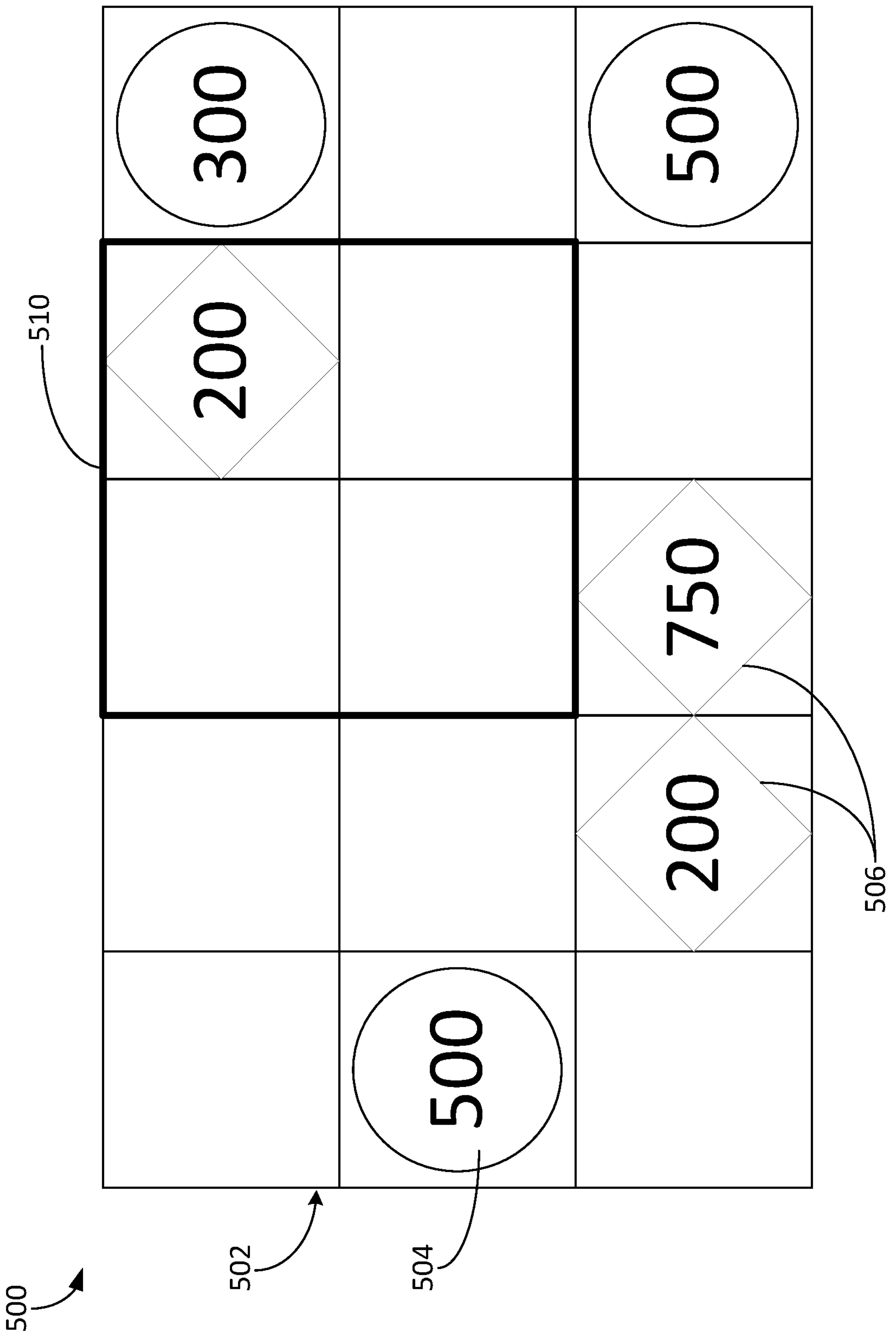
FIG. 8C is an example game interface of the game feature of FIG. 7 with a second multiplier subregion, according to one or more embodiments of the present disclosure.
Figure 8D:
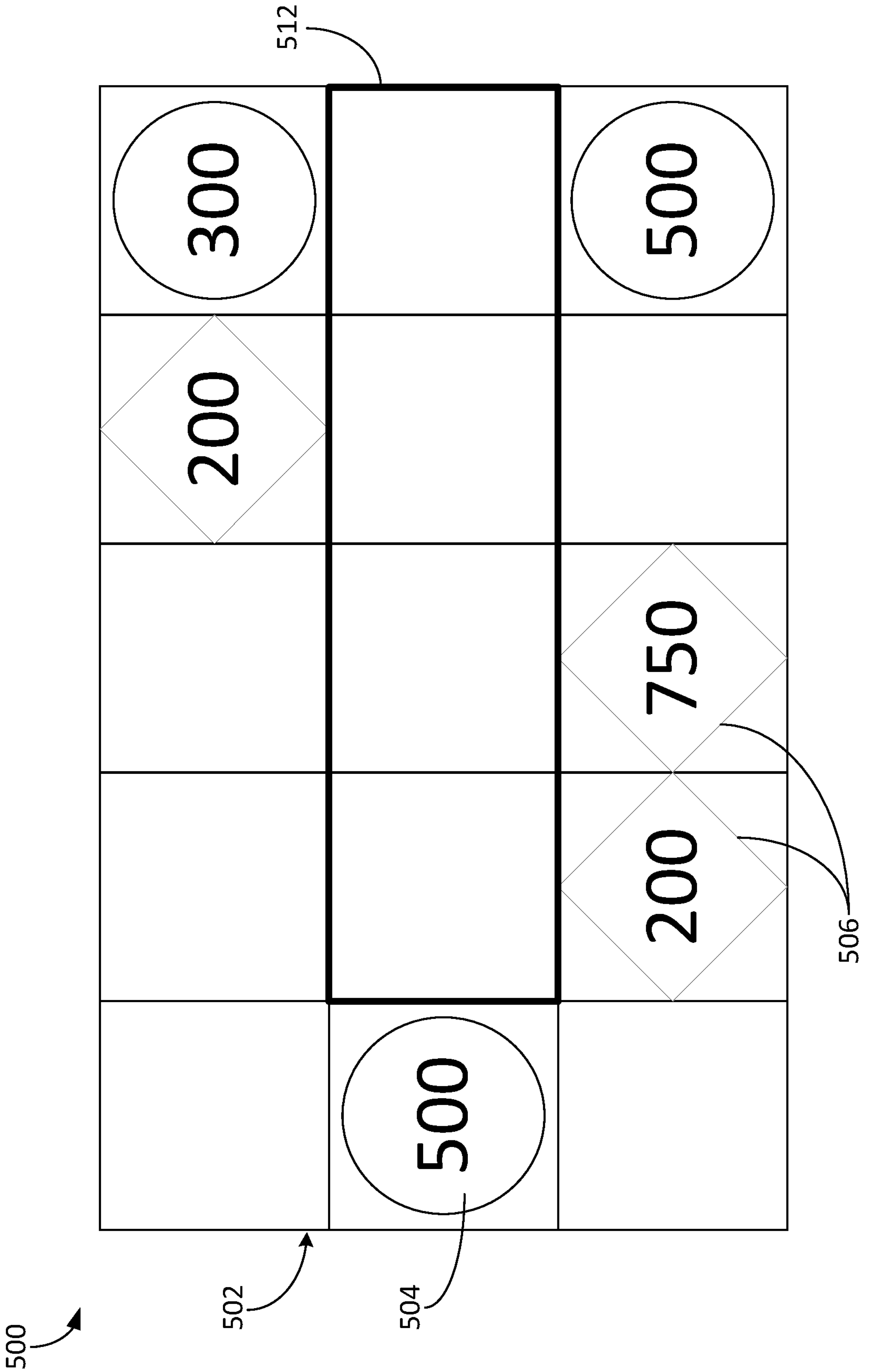
FIG. 8D is an example game interface of the game feature of FIG. 7 with a third multiplier subregion, according to one or more embodiments of the present disclosure.

In the example embodiment, initiating the bonus game feature includes defining a multiplier region within the symbol array 502. The size, shape, and/or configuration of the multiplier region may be based on the number of trigger value-bearing symbols 506 within the array 502. As three trigger value-bearing symbols 506 are present in the interface 500, three subregions are generated and applied to the array 502. FIGS. 8B-8D depict three example multiplier subregions 508, 510, 512 based on the three trigger value-bearing symbols 506. The shape, size, and/or location of each subregion may be at least partially random. In certain embodiments, at least one parameter of a subregion may be based on the location and/or award value of the associated trigger value-bearing symbol 506 or the number of trigger value-bearing symbols 506 within the array 502. In one example, a multiplier subregion may have a randomized shape, but is required to include the symbol position of the associated trigger value-bearing symbol 506.

FIG. 8B depicts the first multiplier subregion 508 as a 2×2 square indicated by the bolded border, FIG. 8C depicts the second multiplier subregion 510 as another 2×2 square of symbol positions, and FIG. 8D depicts the third multiplier subregion 512 as four symbol positions across the middle row of the array 502. These multiplier subregions 508, 510, 512 are combined to form a multiplier region for play of the bonus game feature. Combining the multiplier subregions 508, 510, 512 may be done sequentially within the presentation by the display device such that the multiplier region dynamically grows with each additional subregion. In other embodiments, the subregions 508, 510, 512 may be combined to form the multiplier region prior to being applied to the array 502.

As can be seen from FIGS. 8B-8D, the multiplier subregions 508, 510, 512 may not be independent of each other, but rather may include one or more overlapping symbol positions. The game-logic circuitry is configured to track the number of multiplier subregions 508, 510, 512 overlapping each symbol position. In certain embodiments, the multiplier subregions may be independent from each other such that no overlap is present.

Figure 8E:
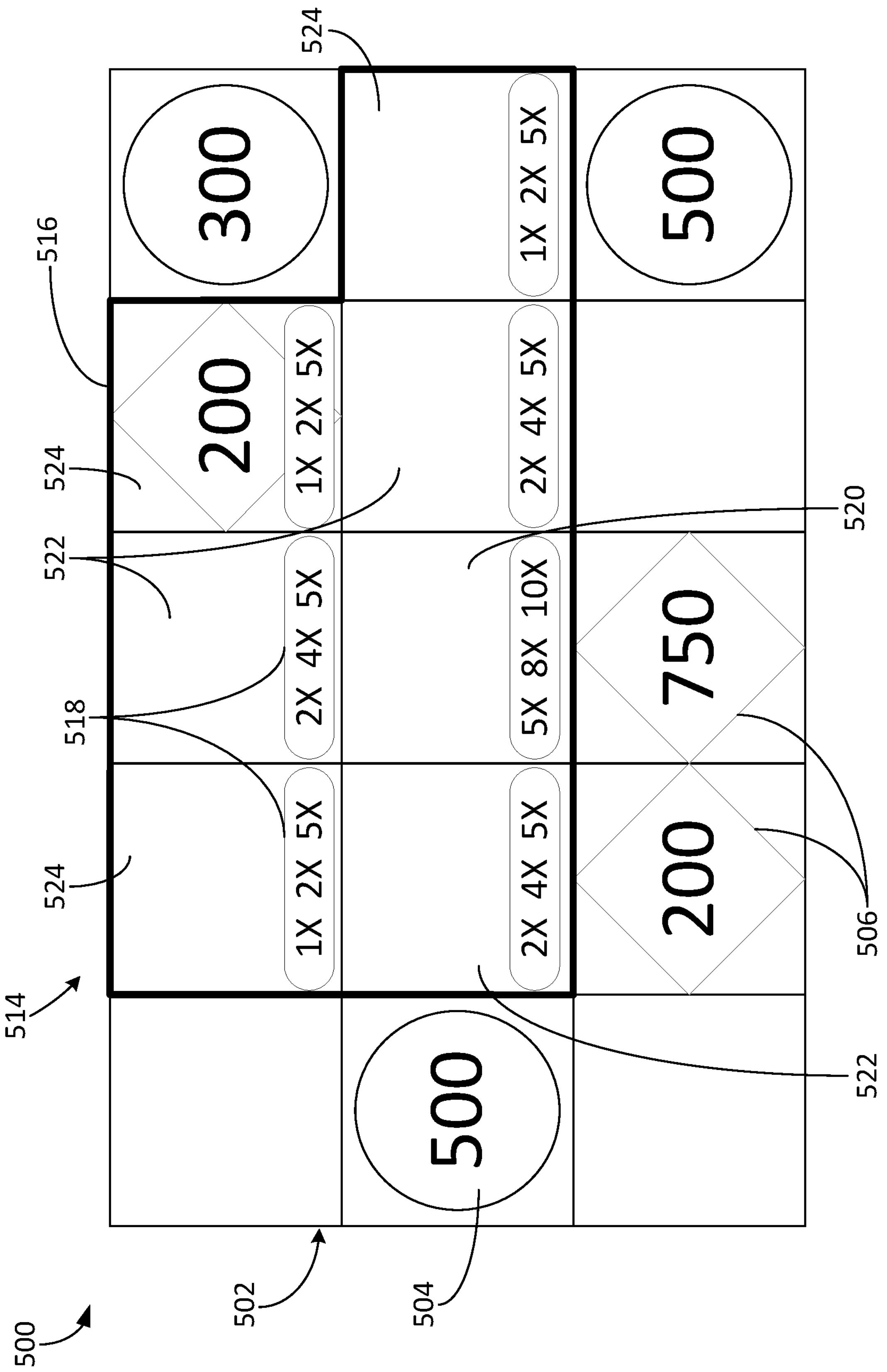
FIG. 8E is an example game interface of the game feature of FIG. 7 in a second state with a modifier region, according to one or more embodiments of the present disclosure.

FIG. 8E depicts the game interface in a second game state after the multiplier subregions 508, 510, 512 have been applied to the array 502. More specifically, the multiplier subregions 508, 510, 512 have been combined to form a multiplier region 514 as indicated by border 516. The multiplier region 514 may include any suitable visual features to aid the player in distinguishing between symbol positions within and outside of the multiplier region 514. For example, and without limitation, the multiplier region 514 and the symbol positions within may include a border, background, animations, and/or other distinctive visual features. Although the border 516 is shown only around the external edge of the multiplier region 514, at least some embodiments include highlighted borders around each symbol position within the multiplier region 514. In certain embodiments, the multiplier subregions 508, 510, 512 may be visually distinguishable within the multiplier region 514 through the bonus game feature.

For the symbol positions within the multiplier region 514, the game-logic circuitry causes the display device to present one or more multiplier selectors 518. In the example embodiment, each symbol position has a respective multiplier selector 518. In other embodiments, each multiplier selector 518 may be associated with a group of symbol positions. In certain embodiments, one multiplier selector 518 is presented for the multiplier region 514 as a whole. Each multiplier selector 518 is configured to present a plurality of available multiplier values. Although the multiplier selectors 518 show all three available multiplier values concurrently, other suitable presentations of the multiplier selectors 518 may include cycling through the available multiplier values one at a time. In certain embodiments, the multiplier selector 518 does not present the multiplier values, but rather keeps the multiplier value visibly hidden until a multiplier value is to be selected as described herein.

In the example embodiment, the multiplier selectors 518 are initialized with a set of 1×, 2×, and 5× multiplier values. However, these multiplier values are configured to increase based on the number of multiplier subregions overlapping the corresponding symbol position. In this example, the values increase to 2×, 4×, and 5× in response to the symbol position being within two multiplier subregions, and the values further increase to 5×, 8×, and 10× in response to the symbol position being within all three multiplier subregions. In some embodiments, the increase in multiplier values may be the result of a mathematical function of the prior multiplier values and the number of overlapping multiplier subregions. It is to be understood that the specific multiplier values as used herein are for exemplary purposes only and are not intended to limit the embodiments described herein.

In some embodiments, in addition to or in place of increasing the multiplier values, additional multiplier values may be added to the set of available multiplier values. For example, if the initial set of multiplier values is 1×, 2×, and 5×, the set may be updated to 1×, 2×, 4×, and 5× in response to the symbol position being within two multiplier subregions. In certain embodiments, some multiplier values, such as the lowest values in the set, may be removed in response to the symbol position being within more than one multiplier subregion, thereby increasing the chance of a higher multiplier value being selected.

In the example embodiment, symbol position 520 is within all three multiplier regions 508, 510, 512, symbol positions 522 are within two of the multiplier regions 508, 510, 512, and symbol positions 524 are only within one of the multiplier subregions 508, 510, 512. Accordingly, the multiplier values for each symbol position of the multiplier region 514 are updated based on the number of overlapping subregions. In certain embodiments, as each multiplier subregion 508, 510, 512 is applied to the array 502, the multiplier selectors 518 are added to the corresponding symbol positions and/or updated in response to an overlapping multiplier subregion.

The multiplier selectors 518 may be presented in a manner that enables a player to view both the multiplier selector 518 and the award indicia of a value-bearing symbol 504 associated with a given symbol position simultaneously. In other embodiments, particularly embodiments in which the multiplier value is selected from the multiplier selector 518 immediately in response to a value-bearing symbol 504 occupying the corresponding symbol position, the multiplier selector 518 or the value-bearing symbol 504 may visually obscure the other until the multiplier selector is removed or hidden.

Figure 8F:
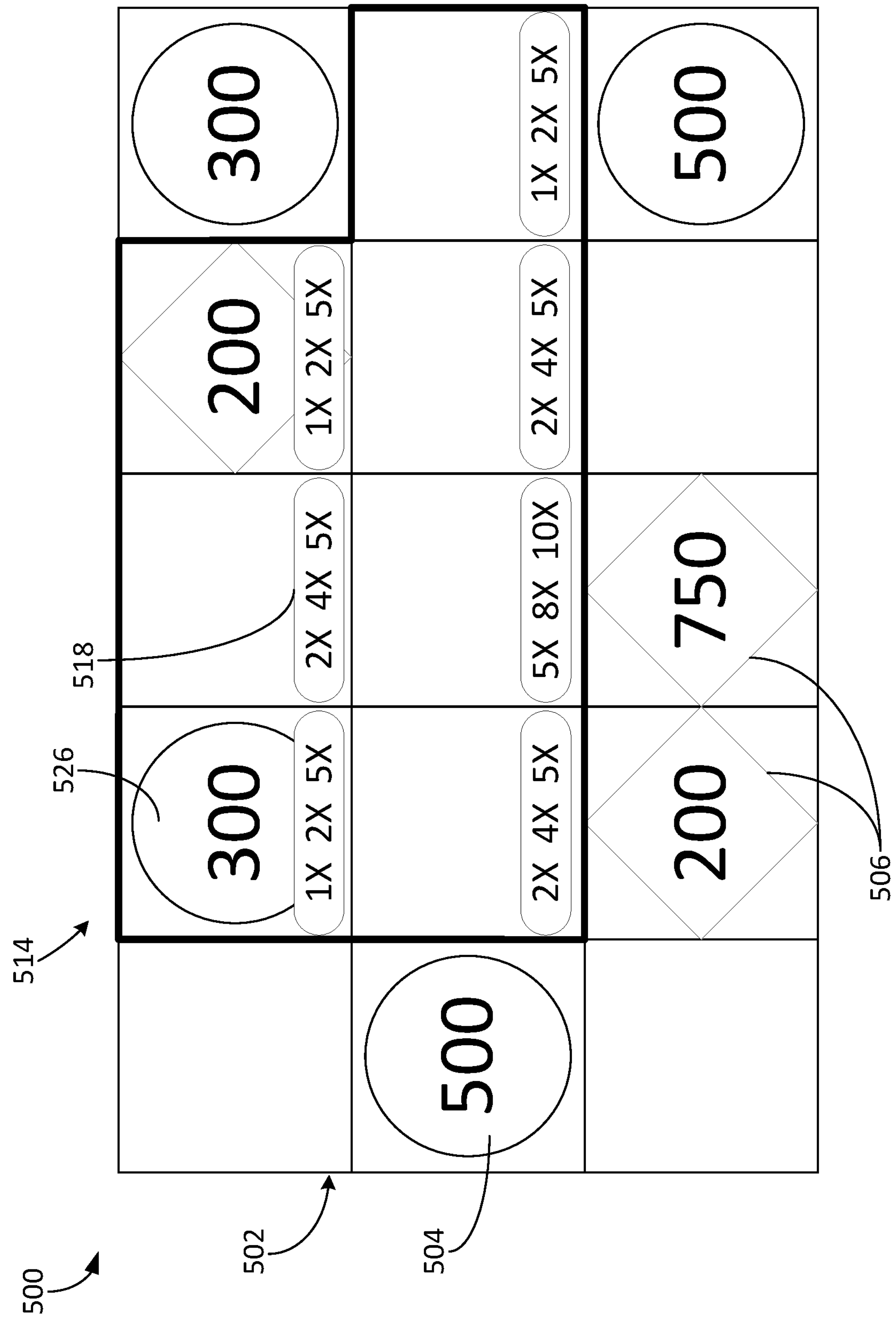
FIG. 8F is an example game interface of the game feature of FIG. 7 in a third state following a first game cycle outcome, according to one or more embodiments of the present disclosure.
Figure 8G:
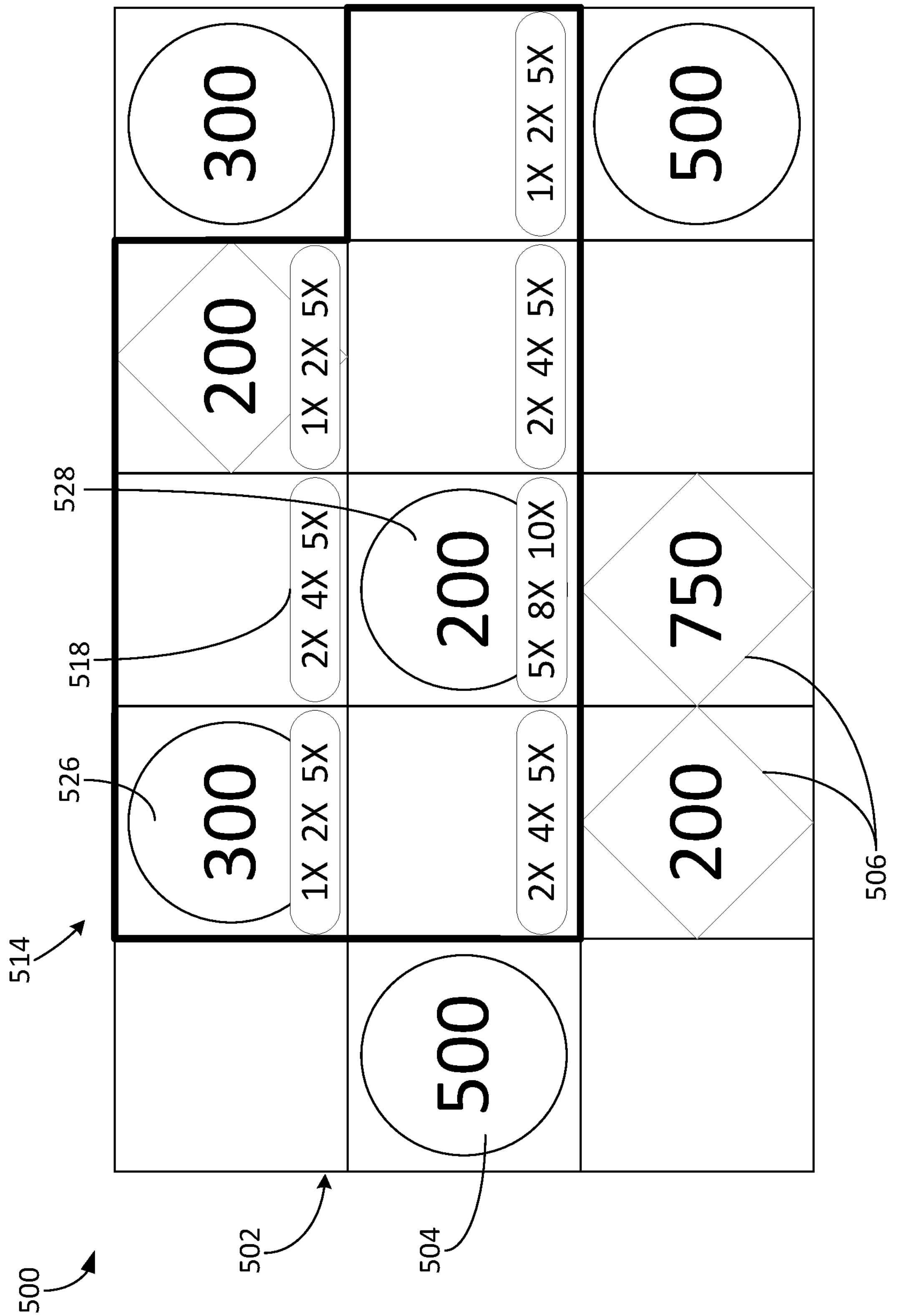
FIG. 8G is an example game interface of the game feature of FIG. 7 in a fourth state following a second game cycle outcome, according to one or more embodiments of the present disclosure.

FIG. 8F depicts the game interface 500 in a third state following a game cycle outcome. During the game cycle outcome, each symbol position of the array 502 that is not already populated by a locked value-bearing symbol 504 is selectively populated with a new value bearing symbol. That is, all, some, or none of the unoccupied symbol positions may be populated with a new value-bearing symbol for a given game cycle outcome. In the third state, a new value-bearing symbol 526 is locked into a symbol position of the multiplier region 514. The new value-bearing symbol 526 may remain fixed or locked until an award is provided for the new value-bearing symbol 526 (e.g., at the conclusion of the bonus game feature). FIG. 8G depicts the game interface 500 in a fourth state following another game cycle outcome. In the fourth state, an additional value-bearing symbol 528 is locked within the multiplier region. The game cycle outcomes may continue to be generated until a termination condition is met, such as reaching a predetermined number of game cycle outcomes.

In at least some embodiments, the multiplier region 514 remains fixed throughout the bonus game feature. In other embodiments, the multiplier region 514 may be dynamically adjusted during the bonus game feature. For example, new trigger value-bearing symbols 506 added to the symbol array 502 during the bonus game feature may expand or otherwise change the multiplier region 514. In another example, the player may be provided the option to manually add and/or remove certain symbol positions from the multiplier region 514. In certain embodiments, new trigger value-bearing symbols 506 may not affect the multiplier region 514 or may not be generated during the bonus game feature.

In the example embodiment, the multiplier selectors 518 are not applied to the value-bearing symbols 504 until a termination condition of the bonus game feature is met. In other embodiments, the multiplier selectors 518 may be applied, separately or as a whole, throughout any suitable point of the bonus game feature. If the multiplier selectors 518 are applied prior to the termination condition, the multiplier region 514 may be configured to update to remove the corresponding symbol position such that the multiplier region 514 only includes unpopulated symbol positions.

To apply the multiplier selectors 518 to value-bearing symbols 504 within the associated symbol positions, a multiplier value is selected from each multiplier selector 518. The selection process may be random, partially random, or predetermined. The presentation of the selection may include cycling through the available multiplier values until landing on the selected multiplier value and updating the award value of the corresponding value-bearing symbol 504. The updated award value is conveyed to the player through updating the award indicia of the value-bearing symbol 504. The multiplier selector 518 may then be visually hidden or removed, and the multiplier region 514 may also be removed in response to all of the multiplier selectors 518 being applied. Multiplier selectors 518 associated with symbol positions not occupied by value-bearing symbols 504 may be removed without affecting the award values of the value-bearing symbols 504.

Figure 8H:
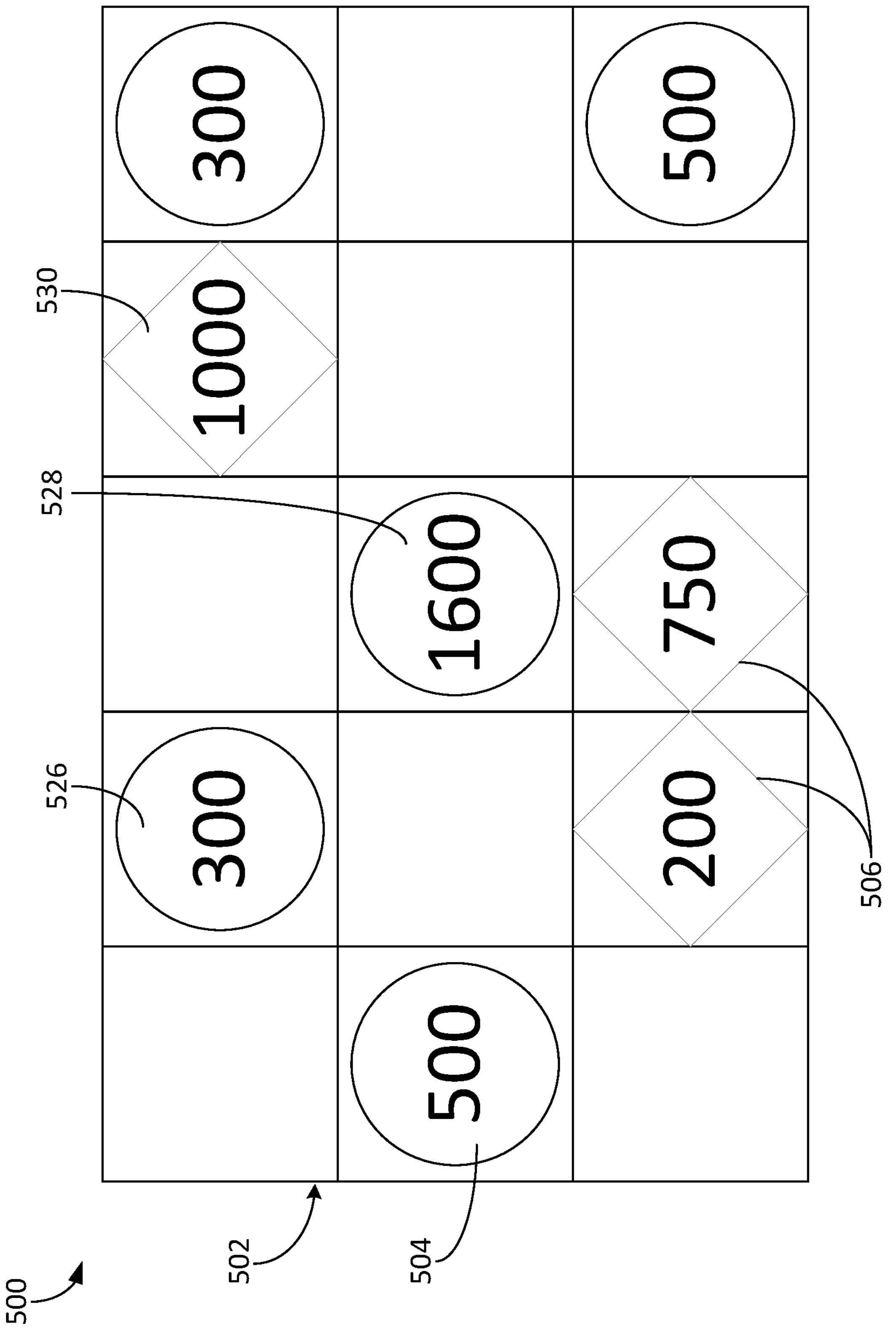
FIG. 8H is an example game interface of the game feature of FIG. 7 in a fifth state after applying modifiers to value-bearing symbols, according to one or more embodiments of the present disclosure.

FIG. 8H depicts the game interface 500 after the multiplier selectors 518 have been applied and removed. More specifically, the value-bearing symbol 526 had a 1× multiplier applied, the value-bearing symbol 528 had an 8× multiplier applied, and the value-bearing symbol 530 (which was a preexisting symbol from the first state) had a 5× multiplier applied. As a result, the award value of the value-bearing symbol 526 remained at 300, the award value of the value-bearing symbol 528 increased from 200 to 1600, and the award value of the value-bearing symbol 530 increased from 200 to 1000 as reflected by the respective award indicia.

In the example embodiment, the award values of the value-bearing symbols 504 within the array 502 are provided to the player through one or more award sequences. The award sequences may include removal of the value-bearing symbols 504 from the array 502. In other embodiments, the value-bearing symbols 504 are not immediately removed, but rather are unlocked from the symbol positions.

Although the foregoing embodiments from FIGS. 4-8H are described in relation to bonus game features, it is to be understood that the game features may also be incorporated into play of a base game feature. The game feature may include variations, particularly to the trigger and termination conditions, to facilitate the use in a base game. Moreover, the foregoing game features may not be limited to wagering games, but rather may also be used in casual games. In such casual games, the awards and credits may not have monetary value, and are used to fund the duration of the game, purchase digital items having no monetary value, and/or other similar uses.

In the embodiments disclosed herein, each value-bearing symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing symbol as part of the reel strip layouts of the game reels. In still other embodiments, the assigned value may be randomly selected before, during, or at the conclusion of a reel spin.

As disclosed in the embodiments herein, awards may be provided for each game outcome based on at least the remaining symbols. For example, line pays and scatter pays may be awarded for each game cycle outcome based on the symbols populating the symbol array. In some embodiments, the value-bearing symbols may not be associated with awards outside of the features described herein. In other embodiments, the value-bearing symbols may be included within line pays, scatter pays, and/or other suitable awards. For example, the value-bearing symbols may be treated as a special symbol, such as a wild symbol.

The embodiments of the present invention provide innovative procedures for aggregating values of symbols in a symbol array and applying dynamic modifiers. Game-logic circuitry executing instructions in accordance with the embodiments present a visual display of spinning reels with clearly enumerated symbology that combine in readily understood arrangements to increase in value. An observer experiences excitement and anticipation as new symbols land in the array and aggregate values are summed and displayed. In stark contrast to conventional reel-spinning games in which symbol images are evaluated for winning combinations by paytable rules, the disclosed embodiments provide immediately recognizable values in WYSIWYG display configurations while adding variability as to how the values to be awarded to the player are selected and accumulated.

The value-aggregation and dynamic modifier procedures may be symbol- and game-agnostic. Themes and imagery of symbols and environment may be varied with no effect on the value-aggregation and dynamic modifier processes. Or, if so desired, the criteria for value-aggregation and/or dynamic modifier may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated-all this adds to processing overhead. Special symbols like wilds, multipliers, and scatter symbols can modify paytable values and may require separate, additional evaluation according to customized rule sets. All these procedures can be inherently more complex than simple aggregation (i.e., addition) of number values. The embodiments disclosed herein represents a win-win: simpler, almost self-explanatory graphics combined with faster, more efficient processing. The inventive value-aggregation and dynamic modifier procedures can be implemented on the vast majority of casino gaming machines without requiring upgrades or modifications.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A gaming machine comprising:

a display device configured to present a plurality of symbol positions; and game-logic circuitry configured to:

in response to detecting a trigger event, cause the display device to visibly reveal a multiplier region including a subset of the plurality of symbol positions;

cause the display device to present one or more multiplier selectors for the multiplier region, each of the one or more multiplier selectors associated with a respective symbol position of the subset and including a respective set of multipliers visibly presented by the display device and including at least two multipliers having a multiplier value greater than one;

cause the display device to present one or more game outcomes with the multiplier region active by populating the plurality of symbol positions with randomly selected symbols, wherein the randomly selected symbols are selected from one or more sets of available symbols including value-bearing symbols, each of the value-bearing symbols having award indicia visibly indicating an award value associated with the value-bearing symbol;

cause the display device to animate a selection sequence for the one or more multiplier selectors associated with symbol positions of the subset being occupied by value-bearing symbols through the one or more game outcomes, the selection sequence including an animation cycling through the respective set of multipliers, wherein the cycling animation visibly indicates selectable multipliers from the respective set of multipliers;

in response to the selection sequence, cause the display device to stop the cycling animation and visibly select a multiplier from the respective set of multipliers for each of the one or more multiplier selectors associated with the symbol positions of the subset being occupied by value-bearing symbols through the one or more game, the selected multiplier being at least partially randomly selected by the game-logic circuitry; and cause the display device to visibly update the award indicia for each of the value-bearing symbols occupying the symbol positions of the subset that are associated with the one or more multiplier selectors to visually indicate a respective updated award value at least partially as a function of an initial award value of the value-bearing symbol and the corresponding selected multiplier.

2. The gaming machine of claim 1, wherein the trigger event includes populating the plurality of symbol positions with at least a threshold number of trigger symbols.

3. The gaming machine of claim 2, wherein the subset including within the multiplier region is based on at least one of the number of trigger symbols within the trigger event or the location of the trigger symbols within the plurality of symbol positions.

4. The gaming machine of claim 2, wherein the respective sets of multipliers are based at least partially on the trigger symbols.

5. The gaming machine of claim 1, wherein the one or more game outcomes includes a plurality of game outcomes, and wherein the game-logic circuitry is configured to cause the display device to lock any value-bearing symbols within the plurality of symbol positions for any remaining outcomes of the plurality of game outcomes.

6. The gaming machine of claim 5, wherein the game-logic circuitry is configured to:

in response to detecting the conclusion of the plurality of game outcomes, cause the display device to stop the cycling animation of the selection sequence; and in response to updating the award indicia of the value-bearing symbols occupying the symbol positions of the subset that are associated with the one or more multiplier selectors, cause the display device to present an award sequence for at least the value-bearing symbols within the multiplier region based on the respective award indicia, wherein the value-bearing symbols associated with the award sequence are removed from the plurality of symbol positions.

7. The gaming machine of claim 1, wherein the one or more multiplier selectors are presented in response to detecting a value-bearing symbol occupying the associated symbol position of the subset.

8. A method of conducting a game using a gaming system, the gaming system comprising game-logic circuitry and a display device of a gaming machine configured to present a plurality of symbol positions, the method comprising:

in response to detecting a trigger event, causing, by the game-logic circuitry, the display device to visibly reveal a multiplier region including a subset of the plurality of symbol positions;

causing, by the game-logic circuitry, the display device to present one or more multiplier selectors for the multiplier region, each of the one or more multiplier selectors associated with a respective symbol position of the subset and including a respective set of multipliers visibly presented by the display device and including at least two multipliers having a multiplier value greater than one;

causing, by the game-logic circuitry, the display device to present one or more game outcomes with the multiplier region active by populating the plurality of symbol positions with randomly selected symbols, wherein the randomly selected symbols are selected from one or more sets of available symbols including value-bearing symbols, each of the value-bearing symbols having award indicia visibly indicating an award value associated with the value-bearing symbol;

causing, by the game-logic circuitry, the display device to animate a selection sequence for the one or more multiplier selectors associated with symbol positions of the subset being occupied by value-bearing symbols through the one or more game outcomes, the selection sequence including an animation cycling through the respective set of multipliers, wherein the cycling animation visibly indicates selectable multipliers from the respective set of multipliers;

in response to the selection sequence, causing, by the game-logic circuitry, the display device to stop the cycling animation and visibly select a multiplier from the respective set of multipliers for each of the one or more multiplier selectors associated with symbol positions of the subset being occupied by value-bearing symbols through the one or more game outcomes, the selected multiplier being at least partially randomly selected by the game-logic circuitry; and causing, by the game-logic circuitry, the display device to visibly update the award indicia for each of the value-bearing symbols occupying the symbol positions of the subset that are associated with the one or more multiplier selectors to visually indicate a respective updated award value at least partially as a function of an initial award value of the value-bearing symbol and the corresponding selected multiplier.

9. The method of claim 8, wherein the trigger event includes populating the plurality of symbol positions with at least a threshold number of trigger symbols.

10. The method of claim 9, wherein the subset including within the multiplier region is based on at least one of the number of trigger symbols within the trigger event or the location of the trigger symbols within the plurality of symbol positions.

11. The method of claim 9, wherein the respective sets of multipliers are based at least partially on the trigger symbols.

12. The method of claim 8, wherein the one or more game outcomes includes a plurality of game outcomes, and wherein the game-logic circuitry causes the display device to lock any value-bearing symbols within the plurality of symbol positions for any remaining outcomes of the plurality of game outcomes.

13. The method of claim 12 further comprising causing, by the game-logic circuitry in response to detecting the conclusion of the plurality of game outcomes, the display device to stop the cycling animation of the selection sequence; and in response to updating the award indicia of the value-bearing symbols occupying the symbol positions of the subset that are associated with the one or more multiplier selectors, causing, by the game-logic circuitry, the display device to present an award sequence for at least the value-bearing symbols within the multiplier region based on the respective award indicia, wherein the value-bearing symbols associated with the award sequence are removed from the plurality of symbol positions.

14. The method of claim 8, the one or more multiplier selectors are presented in response to detecting a value-bearing symbol occupying the associated symbol position of the subset.

15. A gaming system comprising:

a gaming machine comprising a display device configured to present a plurality of symbol positions; and game-logic circuitry configured to:

in response to detecting a trigger event, cause the display device to visibly reveal a multiplier region including a subset of the plurality of symbol positions;

cause the display device to present one or more multiplier selectors for the multiplier region, each of the one or more multiplier selectors associated with a respective symbol position of the subset and including a respective set of multipliers visibly presented by the display device and including at least two multipliers having a multiplier value greater than one;

cause the display device to present one or more game outcomes with the multiplier region active by populating the plurality of symbol positions with randomly selected symbols, wherein the randomly selected symbols are selected from one or more sets of available symbols including value-bearing symbols, each of the value-bearing symbols having award indicia visibly indicating an award value associated with the value-bearing symbol;

cause the display device to animate a selection sequence for the one or more multiplier selectors associated with symbol positions of the subset being occupied by value-bearing symbols through the one or more game outcomes, the selection sequence including an animation cycling through the respective set of multipliers, wherein the cycling animation visibly indicates selectable multipliers from the respective set of multipliers;

in response to the selection sequence, cause the display device to stop the cycling animation and visibly select a multiplier from the respective set of multipliers for each of the one or more multiplier selectors associated with symbol positions of the subset being occupied by value-bearing symbols through the one or more game outcomes, the selected multiplier being at least partially randomly selected by the game-logic circuitry; and cause the display device to visibly update the award indicia for each of the value-bearing symbols occupying the symbol positions of the subset that are associated with the one or more multiplier selectors to visually indicate a respective updated award value at least partially as a function of an initial award value of the value-bearing symbol and the corresponding selected multiplier.

16. The gaming system of claim 15, wherein the trigger event includes populating the plurality of symbol positions with at least a threshold number of trigger symbols.

17. The gaming system of claim 16, wherein the subset including within the multiplier region is based on at least one of the number of trigger symbols within the trigger event or the location of the trigger symbols within the plurality of symbol positions.

18. The gaming system of claim 16, wherein the respective sets of multipliers are based at least partially on the trigger symbols.

19. The gaining system of claim 15, wherein the one or more game outcomes includes a plurality of game outcomes, and wherein the game-logic circuitry is configured to cause the display device to lock any value-bearing symbols within the plurality of symbol positions for any remaining outcomes of the plurality of game outcomes.

20. The gaming system of claim 19, wherein the game-logic circuitry is configured to:

in response to detecting the conclusion of the plurality of game outcomes, cause the display device to stop the cycling animation of the selection sequence; and in response to updating the award indicia of the value-bearing symbols occupying the symbol positions of the subset that are associated with the one or more multiplier selectors, cause the display device to present an award sequence for at least the value-bearing symbols within the multiplier region based on the respective award indicia, wherein the value-bearing symbols associated with the award sequence are removed from the plurality of symbol positions.

21. The gaining system of claim 15, wherein the one or more multiplier selectors are presented in response to detecting a value-bearing symbol occupying the associated symbol position of the subset.

* * * * *